May 15, 1945.  J. D. MOYER  2,376,267
AUTOMATIC WELT TURNER
Filed March 6, 1942  13 Sheets-Sheet 1

INVENTOR.
JOHN D. MOYER

BY

John W. Michael
ATTORNEY.

May 15, 1945.    J. D. MOYER    2,376,267
AUTOMATIC WELT TURNER
Filed March 6, 1942    13 Sheets-Sheet 2

INVENTOR.
JOHN D. MOYER
BY John W. Michael
ATTORNEY.

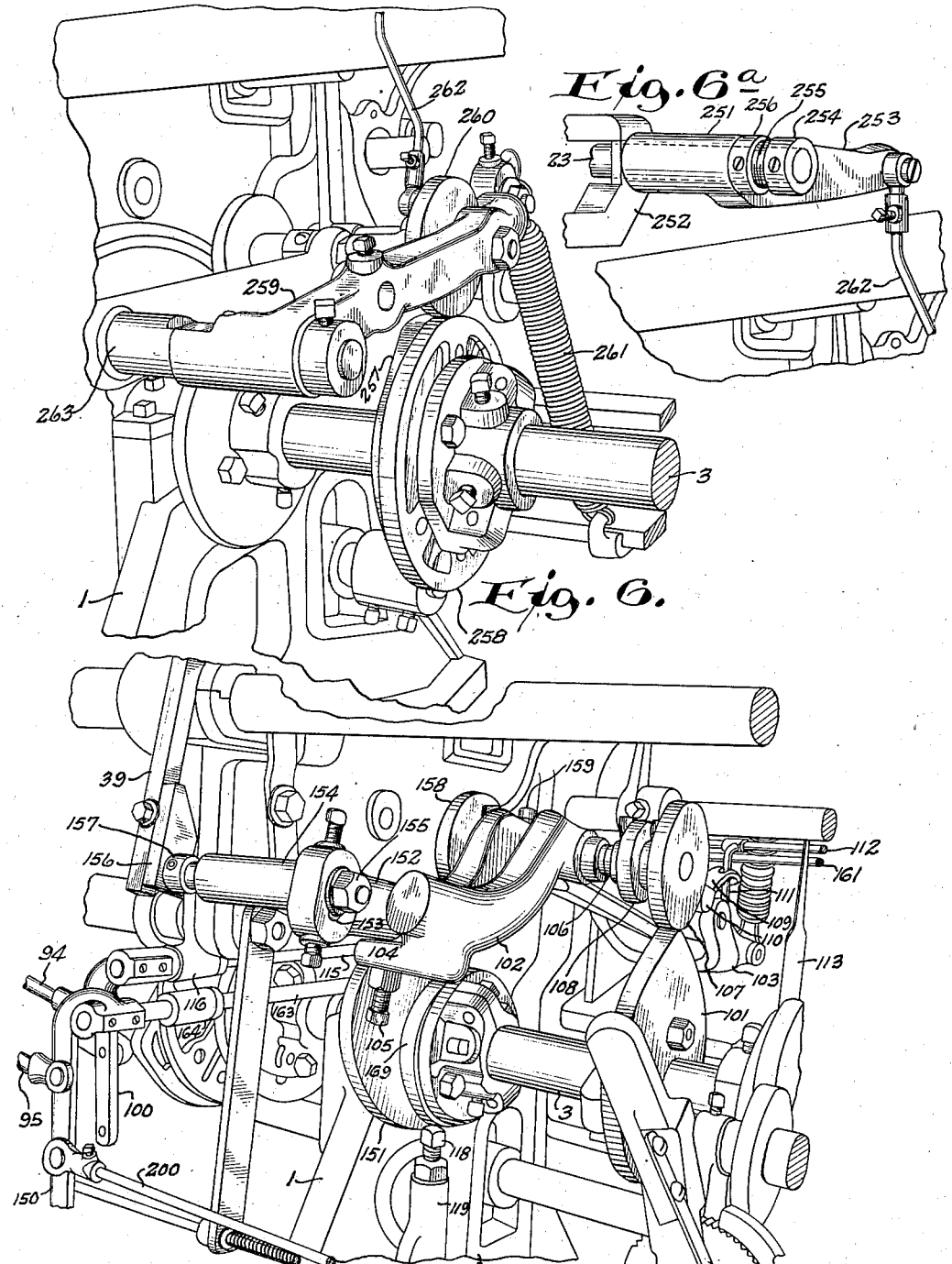

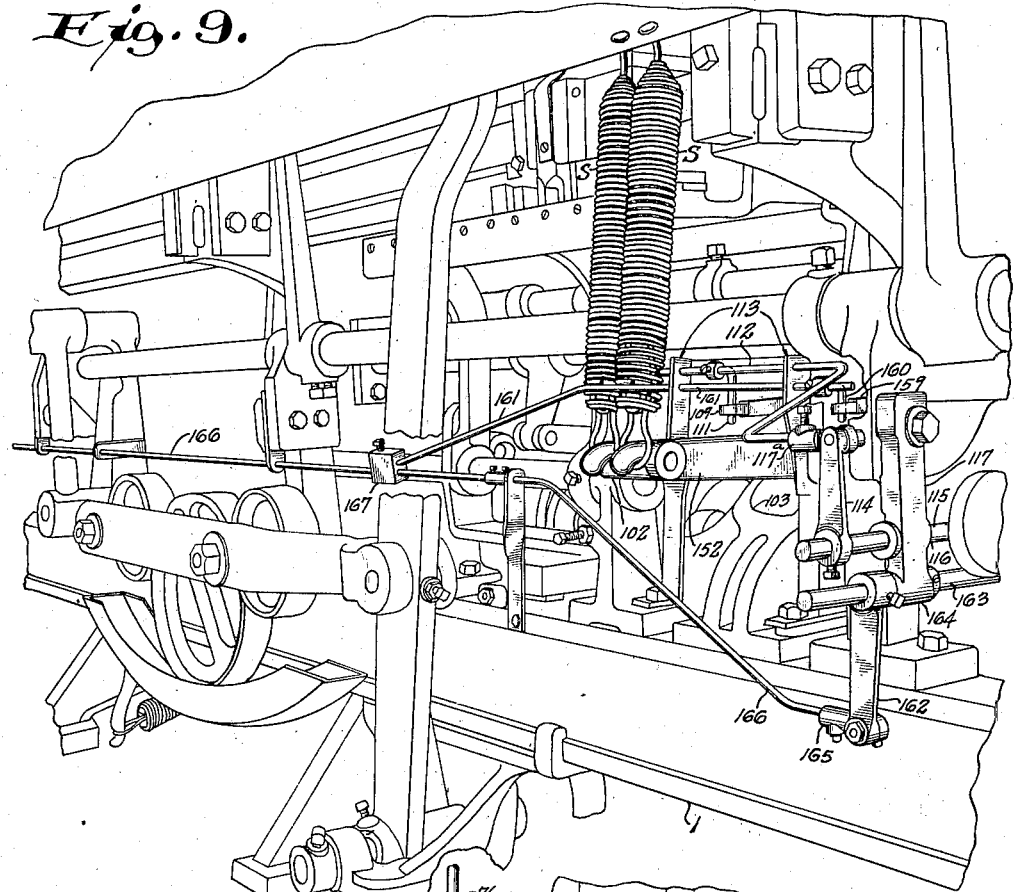

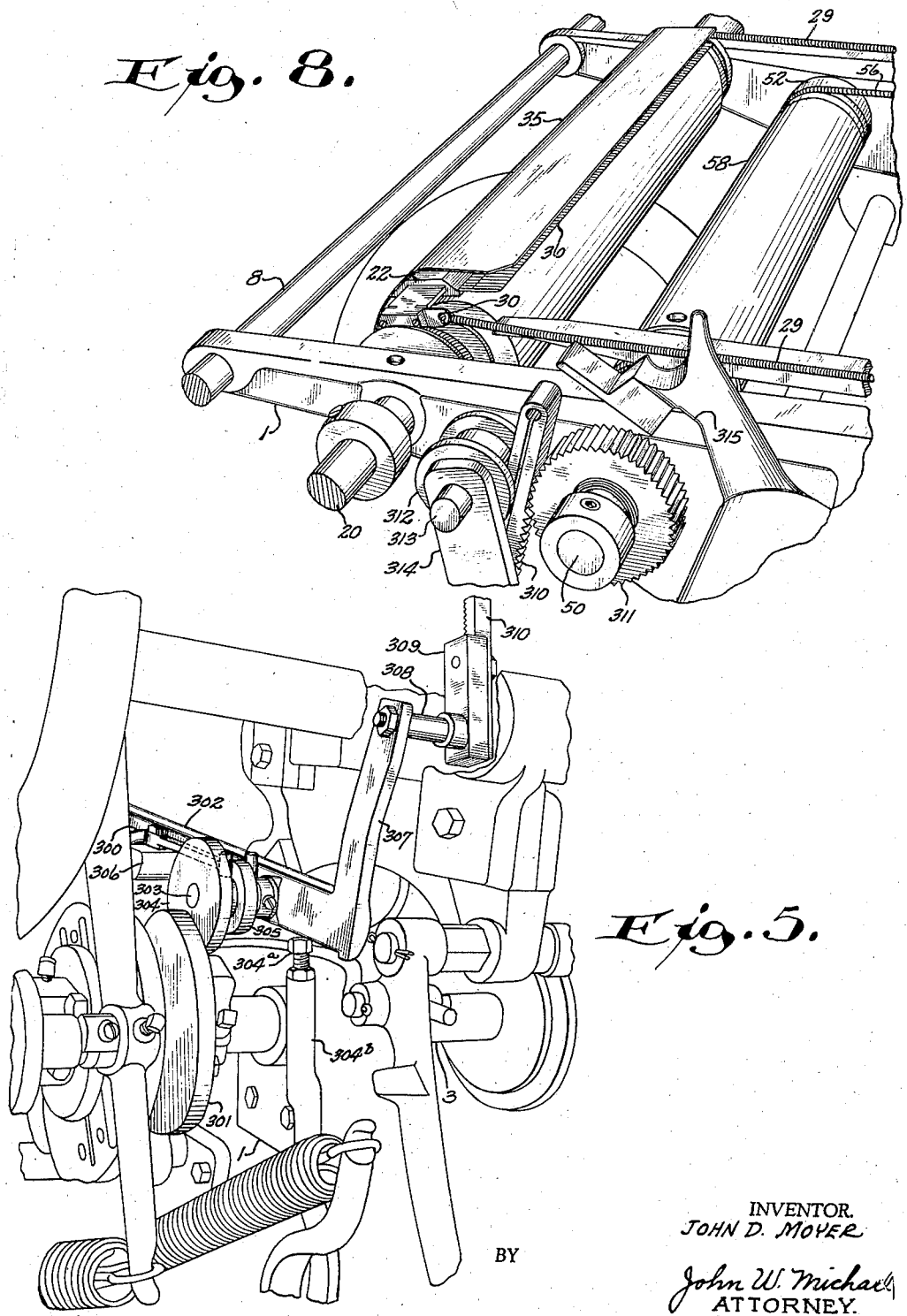

May 15, 1945.   J. D. MOYER   2,376,267
AUTOMATIC WELT TURNER
Filed March 6, 1942   13 Sheets-Sheet 6

INVENTOR.
JOHN D. MOYER
BY John W. Michael
ATTORNEY.

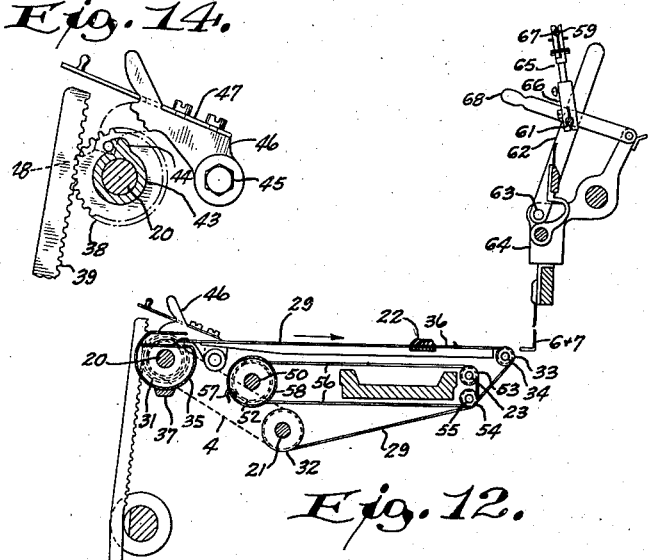

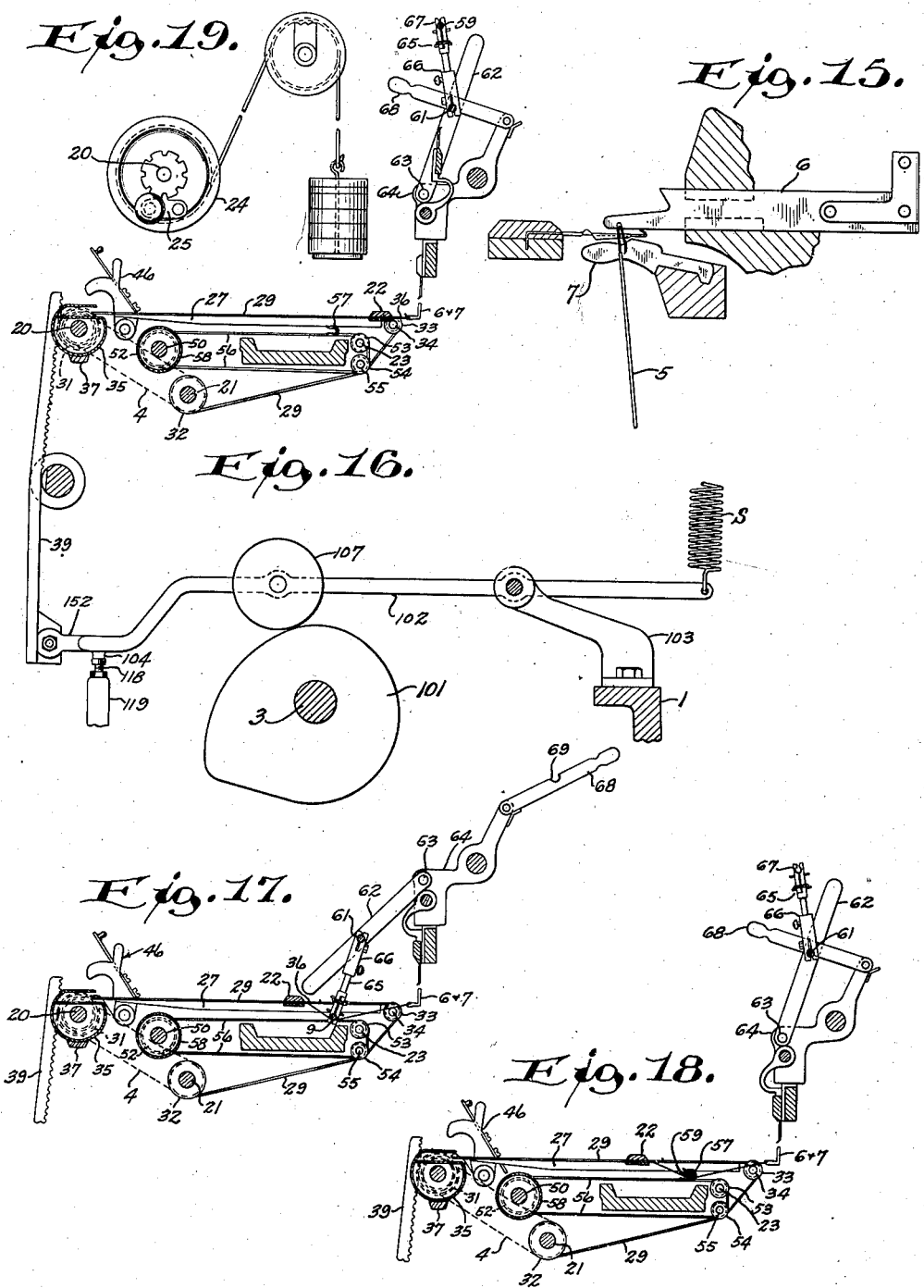

May 15, 1945.　　　　J. D. MOYER　　　　2,376,267
AUTOMATIC WELT TURNER
Filed March 6, 1942　　　　13 Sheets-Sheet 9
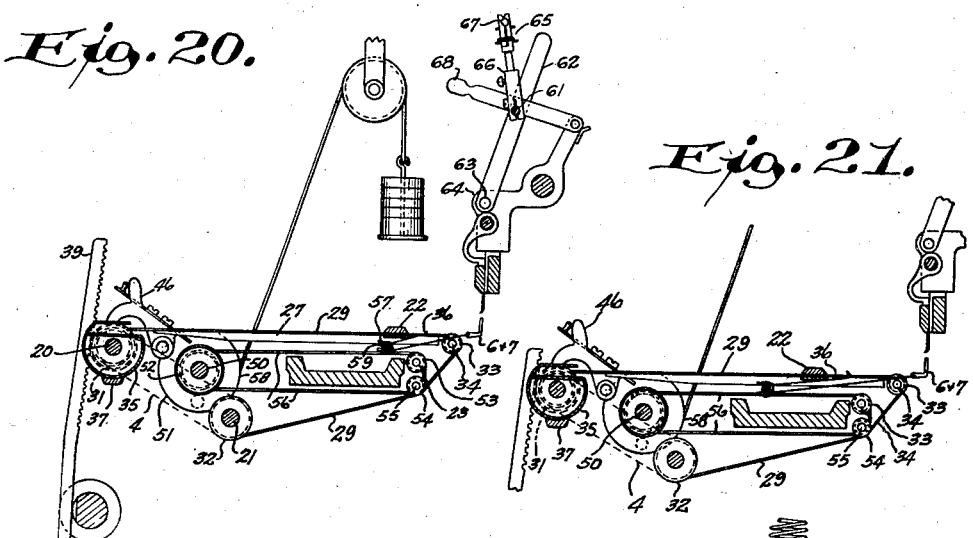
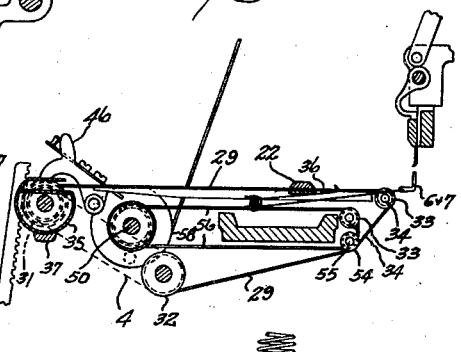
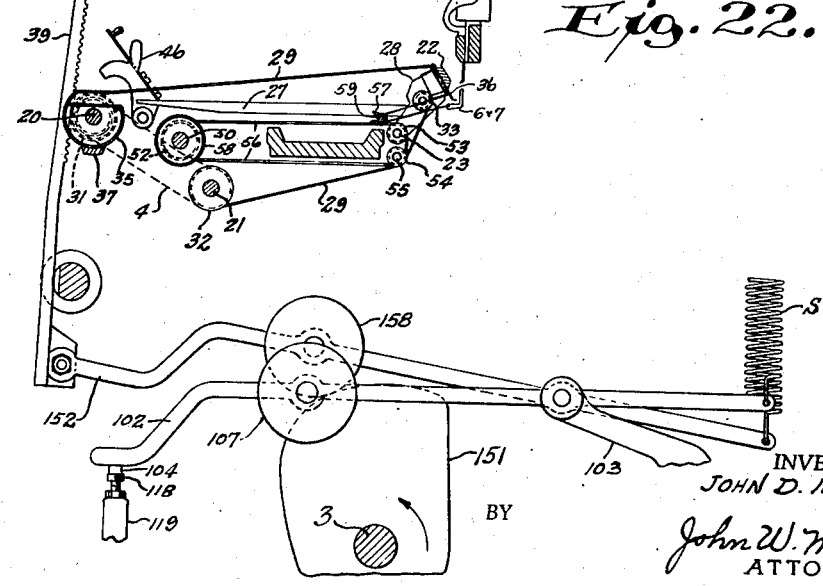
INVENTOR.
JOHN D. MOYER
BY John W. Michael
ATTORNEY.

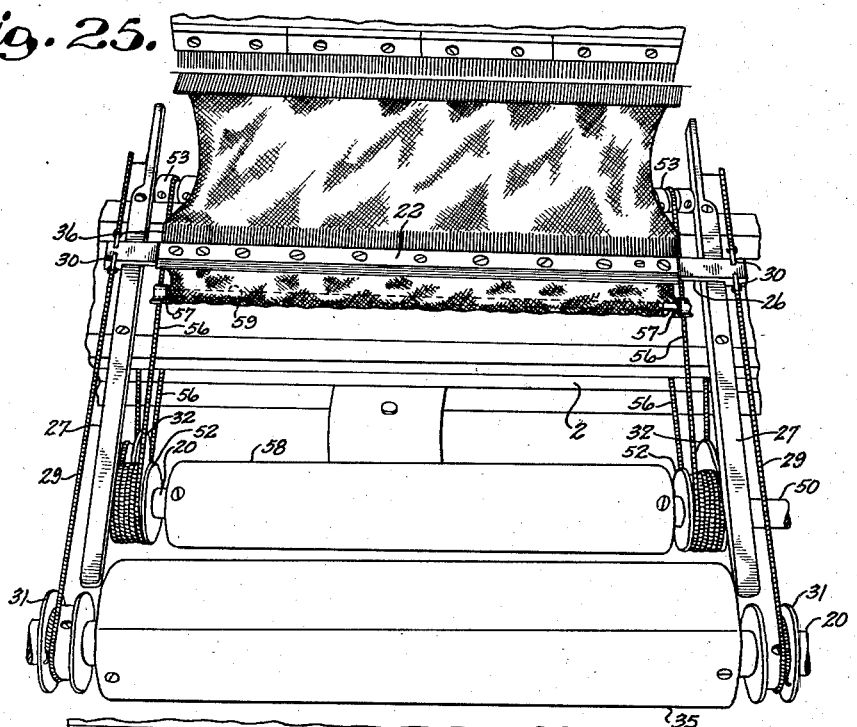

May 15, 1945.  J. D. MOYER  2,376,267
AUTOMATIC WELT TURNER
Filed March 6, 1942  13 Sheets-Sheet 11

INVENTOR.
JOHN D. MOYER
BY
John W. Michael
ATTORNEY.

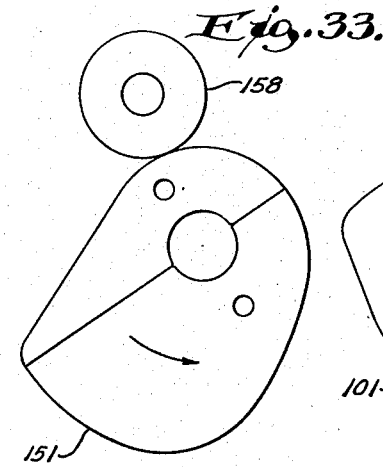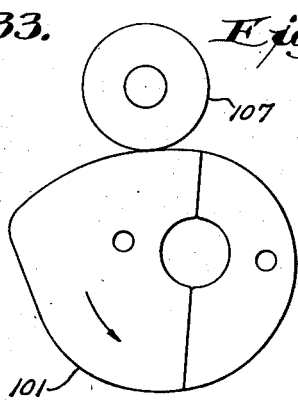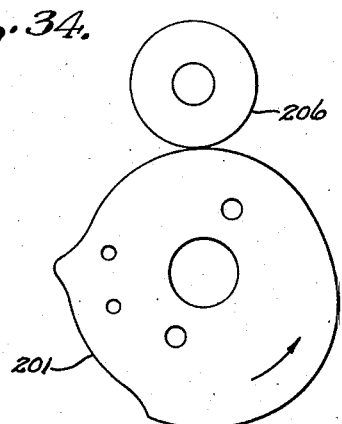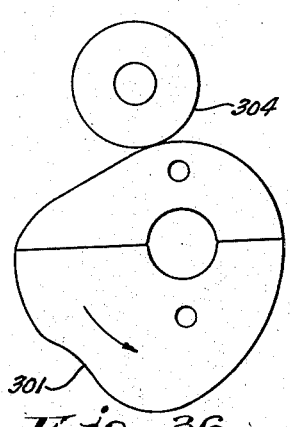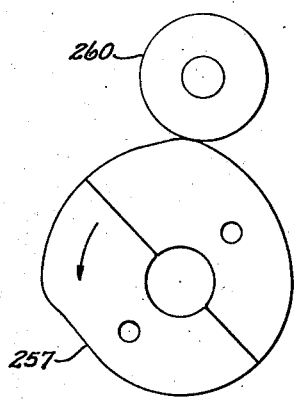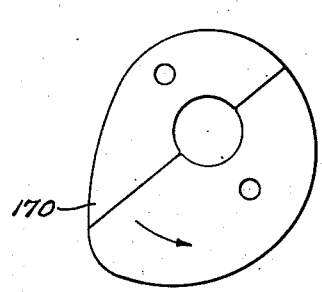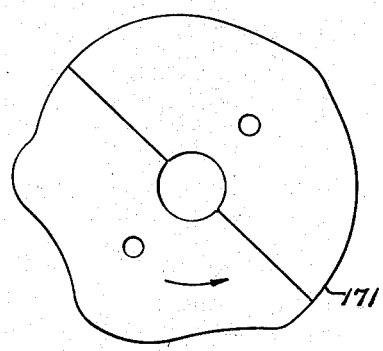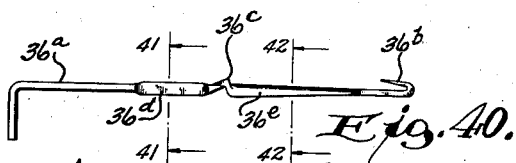

May 15, 1945. J. D. MOYER 2,376,267
AUTOMATIC WELT TURNER
Filed March 6, 1942 13 Sheets-Sheet 13

INVENTOR.
JOHN D. MOYER
BY John W. Michael
ATTORNEY.

Patented May 15, 1945

2,376,267

UNITED STATES PATENT OFFICE 2,376,267

AUTOMATIC WELT TURNER

John D. Moyer, Milwaukee, Wis., assignor to Holeproof Hosiery Co., Milwaukee, Wis., a corporation of Wisconsin Application March 6, 1942, Serial No. 433,532

24 Claims. (Cl. 66—96)

The present invention relates to automatic mechanism for turning and closing the welt of a fabric knit on a flat type machine having narrowing and other operation performing mechanism.

One of the objects of the invention is to provide automtaic mechanism for turning and closing a welt operating under the control of a pattern chain.

Another object of the invention is to provide mechanism for maintaining the proper tension on the fabric being knit which will permit the starting of a new set before clearing off the completed fabric of the preceding set, thus saving operation time.

Another object of the invention is to provide a mechanism in which the welt bar take-up may continuously apply proper tension to the fabric during the knitting thereof, and thereby knit weltless fabric or hosiery without waste of material or extra operations.

Another object of the invention is to provide a mechanism for automatically turning and closing a welt smaller than heretofore possible.

Another object of the invention is to provide mechanism for placing a series of welt wires into position simultaneously to save operation time.

Another object of the invention is to provide mechainsm for simultaneously engaging thread ends and holding them out of the way of the welt bars.

Another object of the invention is to automatically turn and close a welt which is identical in appearance and construction with welts heretofore turned by hand.

Another object of the invention is to provide a welt-turning mechainsm adapted for use in a full-fashioned knitting machine having narrowing and other operation performing mechainsm which is readily incorporated therein without requiring structural alterations in said machine or interfering with the mode of performing picot, graduated reinforcing, and narrowing operations.

A still further object of the invention is to provide a welt-turning mechanism which is synchronized with and utilizes some of the elements used in performing the standard narrowing operation.

The knitting machine herein disclosed, as embodying in a preferred form the features of the present invention, comprises a six section, flat, full-fashioned hosiery machine, which has the standard mechanism for performing the narrowing operation, loose course knitting, and picoting. The machine is also provided with a pattern chain adapted to automatically control the desired sequence of the operations of the knitting machine in its performance of the foregoing operations. Each of the sections includes a series of collectively operated spring beard needles which are given a vertical reciprocatory movement to pull down new loops and lateral reciprocatory movements toward and away from fixed pressing surfaces to close the needle beards and cast off the old loops, and a series of independently movable sinkers which are actuated to a position to kink a new yarn about the needle shanks.

The standard parts of the knitting machine will not be described. They are incompletely shown in some instances in the drawings in order to aid in understanding the manner in which the improvement constituting the present invention is incorporated in the machine without requiring any structural alteration of the standard machine.

The mechanism for turning the welts comprises a multiplicity of welt bars, one for each section of the machine. Each welt bar has a series of welt hooks corresponding in number and in position to the needles in a section. Each section has a pair of flat guides carried by the main table of the knitting machine. The welt bars rest on and ride along the flat guides. At the knitting stations (place where needles operate) of each section, there is positioned adjacent the flat guides a pair of welt bar turning and dipping guides. Each pair of the turning and dipping guides is mounted on a common shaft so that they all are swung in unison from a single operating arm. The turning and dipping guides are adapted to engage with the ends of the welt bars and aid in turning them and in causing them to dip into loop transferring position.

In starting the set, the welt bars are advanced so that the welt hooks extend between the needles, and the sinker loops of the first course are engaged by the welt hooks. During subsequent knitting, the welt bars are retracted from the knitting stations carrying the fabric with them and maintaining proper tension. At a predetermined time welt wires (one for each section) are simultaneously laid on top of the knitted fabric and are engaged by welt wire carriers. This operation is manually controlled. Thereafter the welt bars are automatically moved forwardly to an intermediate locked position, and the welt wire carriers, being urged away from the knitting station under the proper tension, then take over the take-up duty of the welt bars and the fabric is withdrawn under the welt bars. At the point in the knitting when it has been determined to turn the welt, the welt bars are automatically moved forwardly. At the same time the turning and dipping guides are raised. The welt bars move into the turning and dipping guides and are turned so that the welt hooks are pointed substantially downwardly toward the rear of the needles. At this point the welt bars are automatically shifted laterally the spacing of a half needle so that each hook is positioned over a respectively alined needle. They are then dipped down to the needles and are synchronized with the needle and sinker action as it occurs during a standard narrowing motion cycle. Thus, the loops of the first course of the welt, while still on the welt hooks, are placed over the hooks and beards of the needles. As the welt bars are automatically raised, they are also automatically shifted laterally one-half needle position so that the narrowed ends of the welt hooks are again positioned between the needles. Thereafter as an ordinary course is laid, the last course loops, still on the needles, and the first course loops, just placed on the needles, are knitted in with the new course. The welt bar, being still hooked to the fabric, controls the tension thereon. This characteristic is important in that it is one of the elements which contributes to the turning of a small welt; i. e. the use of welt wires may be omitted, which fact of itself permits the welt to be smaller. After knitting some regular courses, the tension is transferred to the welt wire take-up and the operator manually unhooks the welt bar.

In a full-fashioned machine of the type herein disclosed, the cams for controlling the welt turning operation heretofore briefly described are positioned on the main cam shaft of the machine and are synchronized and timed with the customary cams on that shaft which control the knitting operation. Additional pattern buttons are placed on the pattern chain to operate additional levers which control the shifting of rollers into operative engagement with these newly provided cams so that the operation is substantially automatic. The cams, the roller arms through which their motion is effectively translated to the welt bar, and the welt bar guiding mechanism are so incorporated in the standard machine that there need be no change in the conventional motions or construction of such machine.

As part of the welt-turning machine is synchronized with the needle and sinker motion of the machine during a narrowing cycle, certain of the newly added cams are so positioned as to become effective in their operation only when the main cam shaft has been shifted in the customary method to make effective a narrowing cycle. In the type of a machine herein disclosed, however, the narrowing machine may be raised and held out of operation when the narrowing cycle is taking place for utilization in performing the welt-turning operation One of the characteristics of this invention is that take-up tension is exerted through welt wires separately and independently from the conventional take-up tension exerted through welt bars. The welt wires travel on a path below that of the path of travel of the welt bar, and the knitted fabric is wound on a take-up roller which is also below that path of travel. Thus, the operator may immediately start a new set on the machine before clearing off the completed fabric from each section. Thread hooks positioned at each side of a section, below said path of travel, simultaneously engage and hold the thread ends out of the way of the welt bars of each section. There will be sufficient time after the new set has started to clear off the completed fabric while the machine is in operation. This effects an additional saving of time and speeds up the production of the machine.

Another characteristic of this invention is the inclusion of a welt bar roller housing. By means of this, tension may be continuously applied by the welt bar which will be received within the roller housing so that fabric may be wound about both housing and bar. When weltless fabric or small welt fabric is being knit, the use of welt wires and welt wire take-up is omitted.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 3 is a perspective view of that section of the main cam shaft which has thereon the cams for positioning and turning the welt bar, and of the roller arms, shifting rods, levers, and shafts by which the cams and rollers are brought into operative relationship;

Figure 4 is a perspective view, of that section of the main cam shaft which has located thereon the raising cam, and the raising cam bit, and of the roller arms, rod, and shifting fork by which the rollers and cams are brought into operative relation;

Figure 4a is an enlarged perspective view, of the extension of the connecting rod shown in Figure 4, of the crank lever which operates the turning and dipping guide shaft, and of a welt bar turning and dipping guide;

Figure 5 is a perspective view, of that section of the main cam shaft on which is positioned the welt wire tension control cam, and of the roller arm, shifter fork, and rack bar for rotating the welt wire take-up shaft;

Figure 6 is a perspective view, of that section of the main cam shaft on which is positioned the half needle shift cam, and of the roller arm and connecting rod for shifting the welt bar a half needle;

Figure 6a is an enlarged perspective view, of the connecting rod of Figure 6, the crank lever, and the micrometer cam for axially shifting the turning and dipping guide shaft;

Figure 8 is a perspective view of the first section of the machine shown in Figure 1, including the rack bar of Figure 5, the pinion for operating the welt wire take-up shaft and take-up roller, the welt bar positioning shaft, and welt bar housing mounted thereon;

Figure 9 is a perspective view of the rear of the machine taken at about the fourth section of the machine as shown in Figure 1, including the operating shafts, levers, and rods for operating the shifting forks controlling the positioning of the rollers on the roller arms viewed in Figure 3;

Figure 12 is a diagrammatic view of the welt bar and the positioning cam as positioned at the start of the set;

Figure 13 is a diagrammatic view of the welt bar latch and the positioning cam after three-quarters of the starting-of-the-set cycle has been completed;

Figure 14 is an enlarged fragmentary view, part in side elevation and part in section, of the welt bar positioning latch mechanism;

Figure 15 is an enlarged, fragmentary, diagrammatic view in side elevation of the welt bar and welt hooks, needles, sinkers, and knock-over bits, when the welt bar has been moved to the position shown in Figure 13;

Figure 16 is a diagrammatic view of the welt bar, welt bar latch, and positioning cam, at the completion of the starting-of-the-set cycle. At this point the roller is moved out of engagement with the cam;

Figure 17 is a diagrammatic view of the welt bar after a picot has been performed, and of the welt wire placer when in its lowered position for engaging the welt wires with the welt wire hooks;

Figure 17a is an enlarged fragmentary view in side elevation of the welt wire placer;

Figure 18 is a diagrammatic view of the welt bar and welt wire when the welt wire has been inserted in the welt wire take-up;

Figure 19 is an enlarged fragmentary view in side elevation of the tensioning drum mechanism for the welt bar;

Figure 20 is a diagrammatic view of the welt bar, welt wire, and tensioning drum mechanism for the welt wire take-up shaft stationed at a point in the re-positioning of the welt bar to latched position;

Figure 21 is a diagrammatic view of the welt bar and welt wire as positioned some time after the completion of the latch position operation (from this latched position the welt-turning operation is started) with tension now being maintained on the fabric through the operation of the welt wire take-up;

Figure 22 is a diagrammatic view of the welt bar, turning and dipping guides, and turning cam, as positioned at a point approximately one-half of the way through the turning cycle;

Figure 23 is a fragmentary view in side elevation of the latch for the welt wire tensioning device;

Figure 25 is a perspective view of one section of the knitting machine illustrating the manner in which the welt bar maintains the tension on the fabric after the welt has been turned and knitted in;

Figure 26 is a perspective view of the section shown in Figure 25 with the welt bar removed and positioned in the welt bar housing, and with the tension on the fabric being maintained by the welt wire tensioning device;

Figure 27:
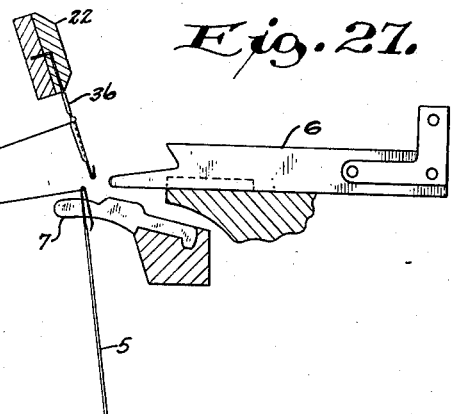
Figure 29:
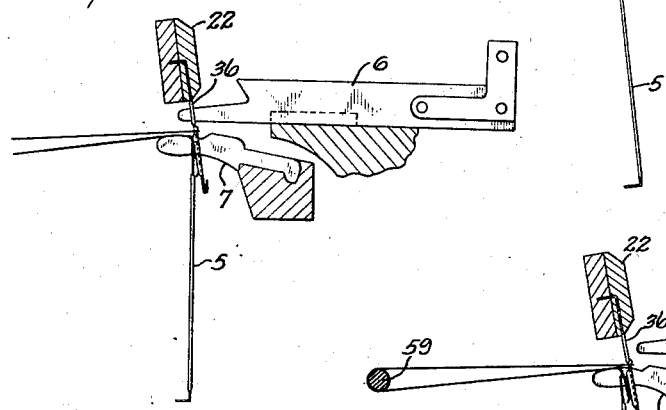
Figure 28:
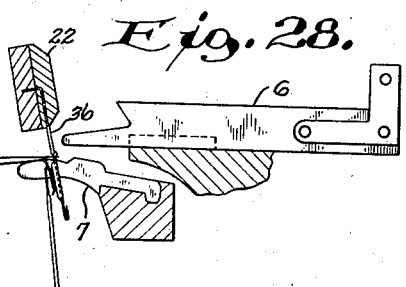
Figure 30:
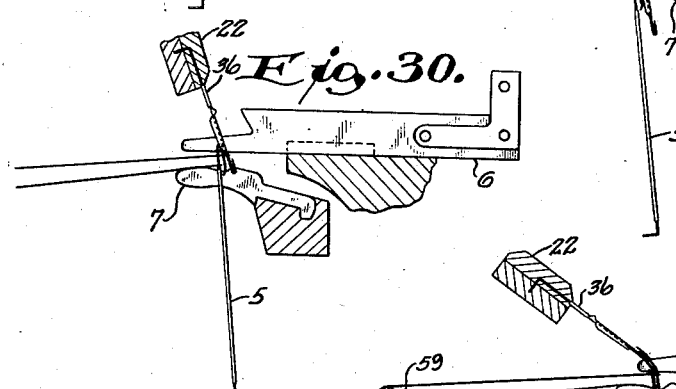
Figure 31:
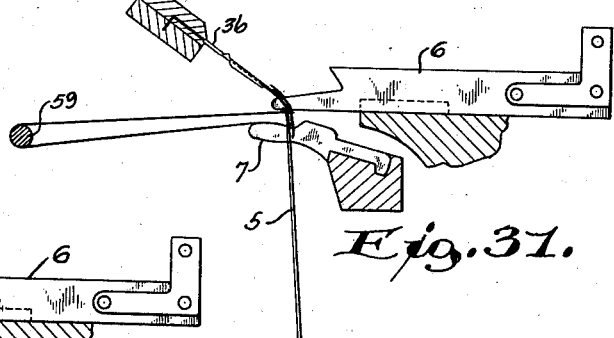
Figure 32:
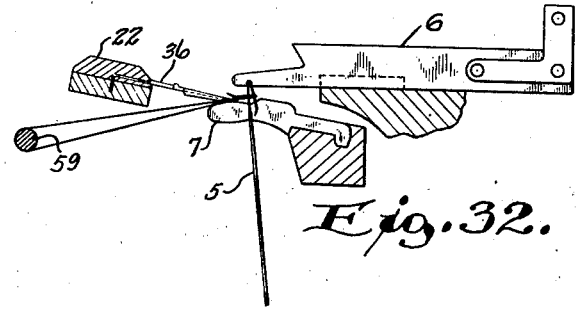
Figure 43:
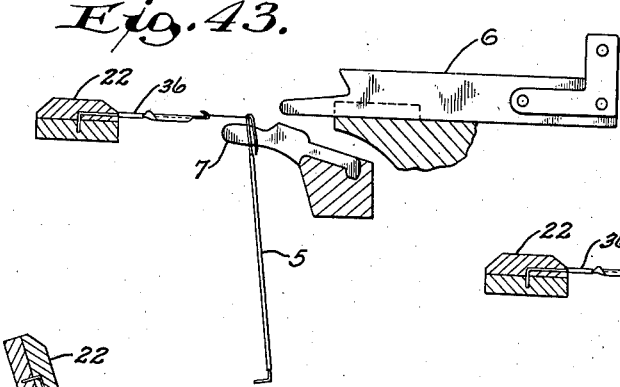
Figure 44:
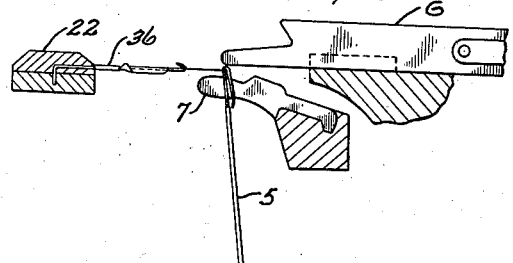
Figure 45:
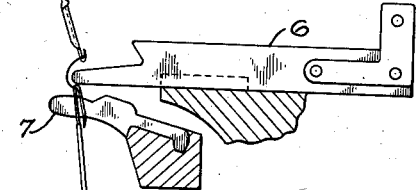
Figure 46:
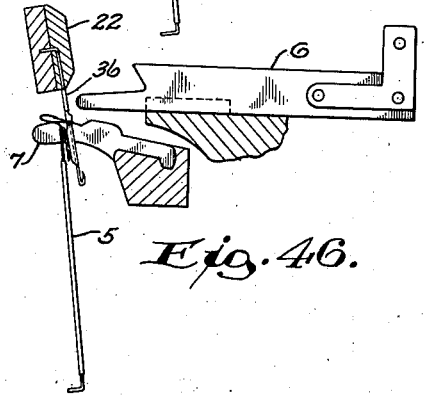
Figure 47:
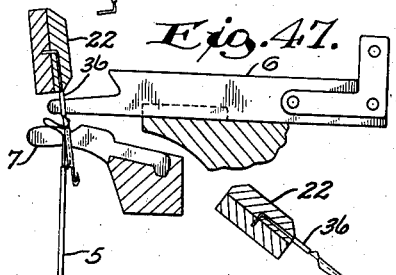
Figure 48:
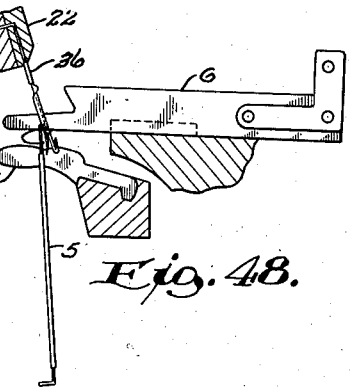
Figure 49:
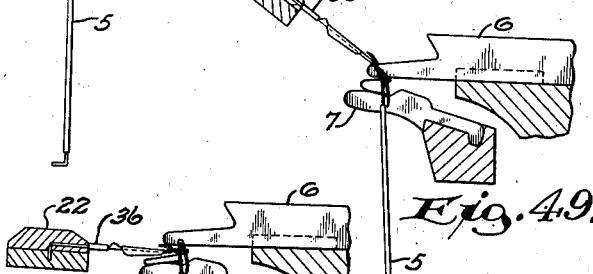
Figure 50:
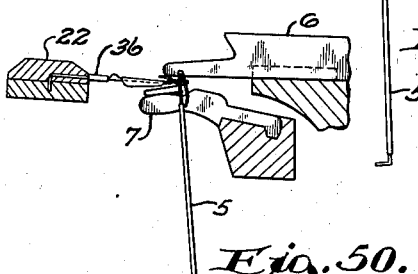

Figures 27 to 32, inclusive, are diagrammatic views of the welt bar, welt hooks, needles, sinkers, and knock-over bits, during certain sequences of the turning and knitting in of the welt; in Figure 27 the relative position of these parts is shown just prior to the dipping of the welt bar; in Figure 28 the relative position of these parts is shown after the welt bar has been dipped and the sinkers started to advance; in Figure 29 the relative position of these parts is shown as the needles have been pressed against and into the groove in the welt hooks and the sinkers advanced in between the welt hooks over the welt loop thereon; in Figure 30 the relative position of these parts is shown as the sinkers have forced the welt loop down on the eye of the welt hook and over the eye of the needle; in Figure 31 the relative position of these parts is shown just after the welt hooks have been shifted sidewise a half a needle so as to lie between the needles and the welt loop position over the eye of the needle and still on the hook of the welt hook with the welt bar in a partially lowered position; and in Figure 32 the relative position of these parts is shown at completion of the lowering of the welt bar, with the welt loop still held in the hook of the welt hooks, the welt loops over the eye of the needles, and the last course of loops in the eyes of the needles. From this position regular knitting can be commenced and the sinker loops of the new course will be drawn through both the last course loops and the welt loops;

Figures 33 to 39, inclusive, are diagrammatic views of the various cams and the respective rollers operated by them. The cams are shown as viewed from the right in the various figures with the shaft and each cam positioned just beyond the point in the revolution of the shaft that the shifting of the rollers into engagement with the cams begins to take place. These views indicate the proper cam contour and relative positioning of each cam with respect to every other cam; Figure 33 shows the turning cam, also shown in Figure 3; Figure 34 shows the positioning cam also shown in Figure 3; Figure 35 shows the raising cam, also shown in Figure 4; Figure 35a shows the cam bit attached to the cam shown in Figure 35; Figure 36 shows the tension cam, also shown in Figure 5; Figure 37 shows the half needle cam, also shown in Figure 6; Figure 38 shows a special small welt turning cam to be substituted for the turning cam shown in Figure 33 when it is desired to turn short welts; Figure 39 shows a special catch bar cam which is substituted for the catch bar cam narrowing side during the turning of short welts or which may be added adjacent the catch bar cam;

Figure 40 is an enlarged view in side elevation of a welt hook;

Figure 41 is an enlarged cross sectional view taken on the line 41—41 of Figure 40;

Figure 42 is an enlarged cross sectional view taken on the line 42—42 of Figure 40; and Figures 43 to 50, inclusive, are diagrammatic views of the welt bar, welt hooks, needles, sinkers and knock-over bits, during certain sequences of the turning of a short welt preparatory to knitting in; in Figure 43, the relative position of these parts is shown after 10 to 16 courses have been knitted; in Figure 44, the relative position of these parts is shown after the sinkers and dividers have been advanced to the turning position; in Figure 45, the relative position of these parts is shown after the welt bar has been raised and before it has been dipped, the knitted fabric being held by the noses of the sinkers and dividers so as to prevent it from getting between the needles and the welt hooks; in Figure 46, the relative position of these parts is shown after the sinkers and dividers have been withdrawn and the welt bar has been dipped, to carry the first course loops up to the humps in the welt hooks and to bring the beards of the needles into alignment with the grooves on the welt hooks; in Figure 47, the relative position of these parts is shown after the sinkers and dividers have advanced, and the needles have been pressed against and into the grooves of the welt hooks; in Figure 48, the relative position of these parts is shown as the welt bar is raised and the sinkers have forced the first course loops down the welt hooks and on to and over the eyes of the needles; in Figure 49, the relative position of these parts is shown as the welt bar is being lowered and shifted sidewise a half needle; the first course loops are now in the hook portions of the welt hooks and are also held over the eyes of the needles by the sinkers and dividers; and in Figure 50, the relative position of these parts is shown at the completion of the lowering of the welt bar with the first course loops still held in the hooks of the welt hooks and over the eyes of the needles and the loops of the course last knitted held only in the eyes (under the beards) of the needles; from this position regular knitting is commenced, and the sinker loops of the next laid course will be drawn through both the last course loops and the first course loops.

Figure 1:
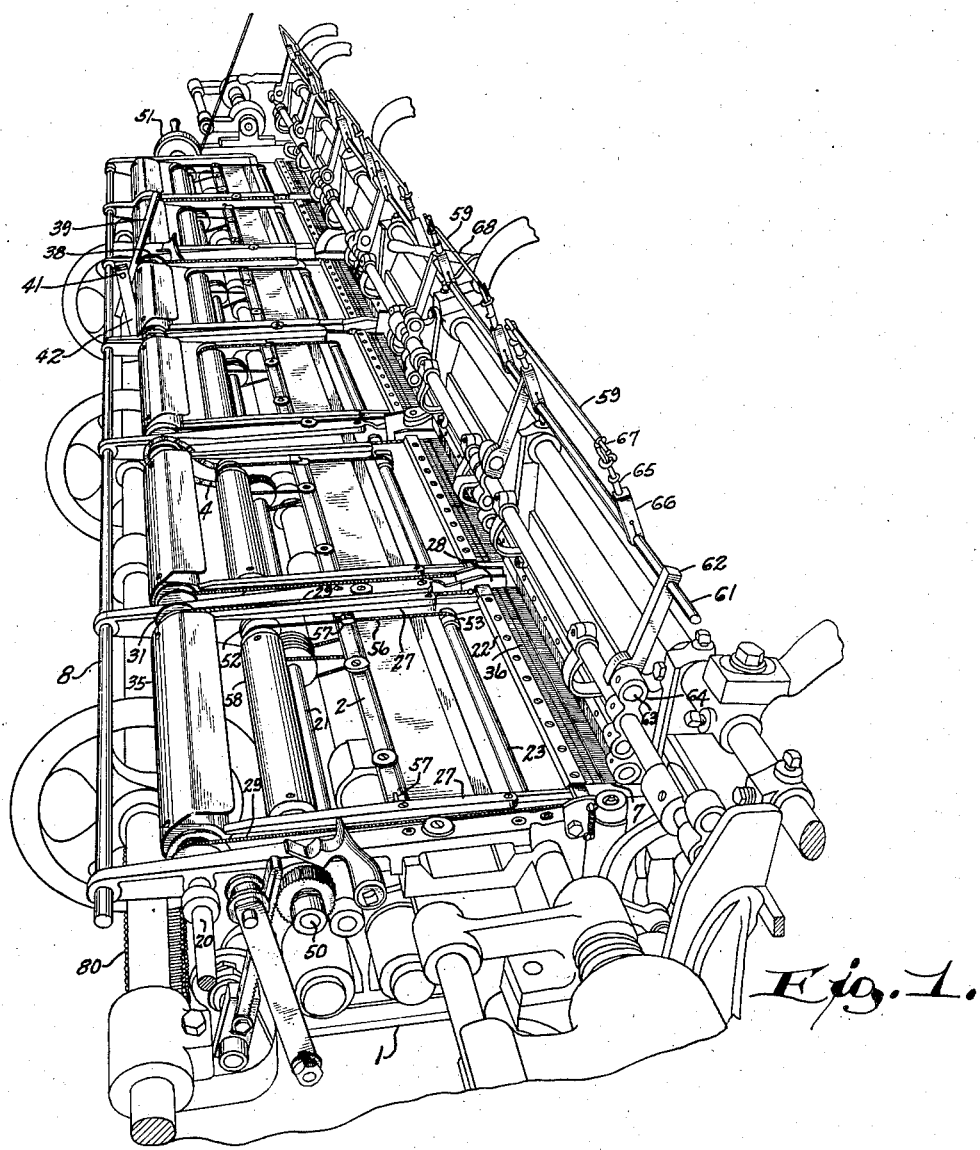
Figure 1 is a perspective view of a six section cotton system full-fashioned machine embodying the automatic welt-turning mechanism.

Referring now to the drawings, the machine comprises a frame 1, which provides a support for the table 2. The frame 1 also supports a main cam shaft 3, which carries the cams for controlling the specific motions hereinafter described. In addition, this frame 1 provides a support for the welt bar take-up shaft 20 and its associated wind-up shaft 21, the welt wire take-up shaft 50, the welt bar 22, and the control shaft 23 for the turning and dipping guides. The welt bar take-up shaft 20 and the wind-up shaft 21 are connected together by a sprocket and roller chain assembly 4 so as to have a one-to-one ratio. The welt bar take-up shaft 20 has a tensioning drum 24 located thereon which has a latching mechanism 25 which permits the operator to place tension on the shaft by winding some of the cable on the drum (see Figure 19). The welt wire take-up shaft 50 also has a tensioning drum 51 positioned adjacent the last section. This drum 51 operates in like manner as the welt bar drum 24, and tension may be placed on the shaft 50 at the will of the operator (see Figures 1 and 20). The needles 5, sinkers and dividers 6, and knock-over bits 7 are held and operated in the customary manner, their operation being controlled by various cams located on the main cam shaft 3. Operation of the motor for starting and stopping the machine is controlled by the starting bar 8, which is positioned at the front of the machine and is extensive of all sections of the machine so as to be operable by the operator at any point.

As each section of the machine has exact duplicate parts, the description will be confined to one section. It is to be understood that the various exact duplicate parts are operated jointly from single shafts extending through all sections. As hereinafter used, clockwise and counterclockwise will be as viewed from the front or the right as the case may be.

Figure 7:
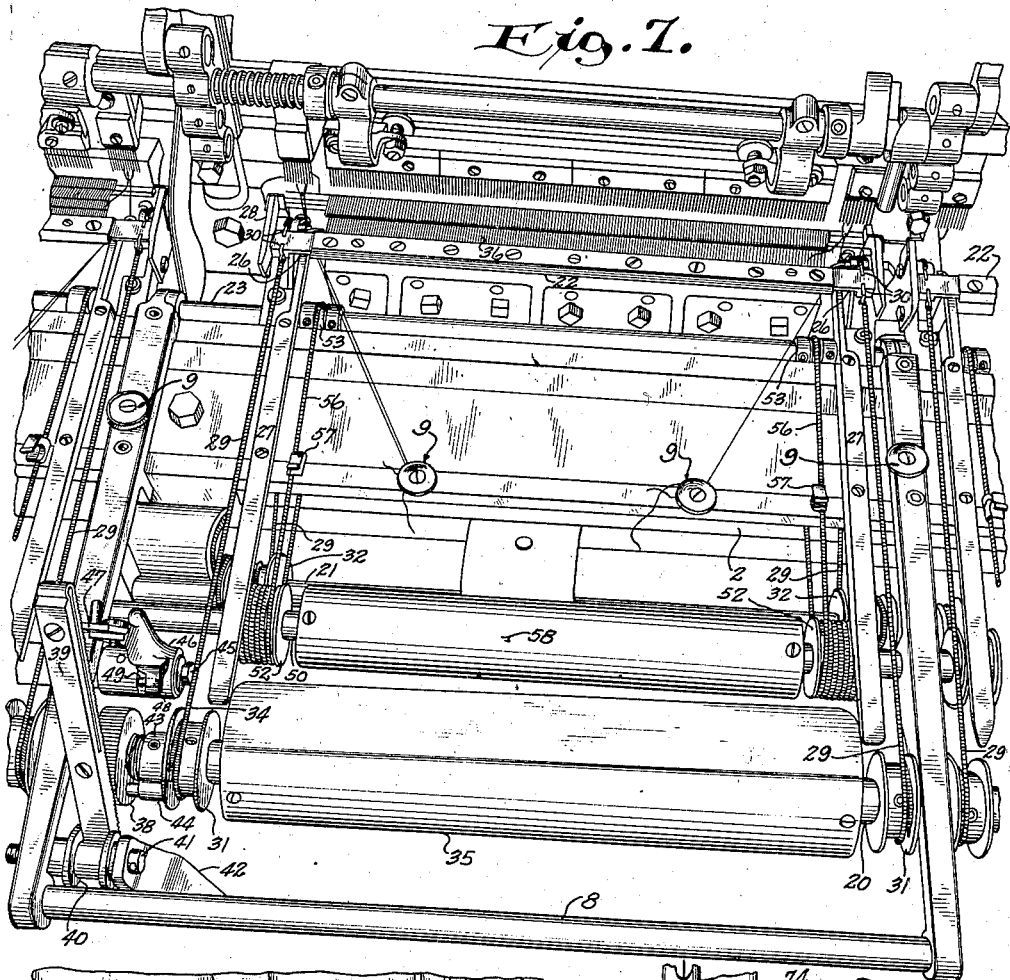
Figure 7 is a perspective view, looking downwardly toward the fourth section of the knitting machine of Figure 1, of the welt bar with its welt hooks advanced to the knitting station, the welt bar flat guides, the welt bar positioning drums and their respective connected shafts, the welt wire carriers and take-up shaft and take-up roller mounted thereon, and of the rack bar disclosed in Figure 3.

As is shown in Figure 7, the welt bar 22 has the lower portion of its ends recessed to provide slots 26 engageable with a pair of flat guides 27 screwed to the table 2. These flat guides 27 extend from a point substantially near the welt bar take-up shaft 20 to a point adjacent the knitting station. This end of the guides is narrowed to provide operating space for the operation of the turning and dipping guides 28. The movement of the welt bar 22 toward and from the knitting station on the flat guides 27 is controlled by spring belts 29. One end of each belt 29 is fastened to a respective forward or rear side of the ends of the welt bar 22 by means of connecting tongues 30 pivotally carried in slots formed in the welt bar 22. One pair of spring belts 29 extends rearwardly from the welt bar 22 to drums 31 secured to the welt bar shaft 20. The other pair of spring belts 29 extend forwardly from the welt bar 22 to cone-shaped drums 32 positioned on the wind-up shaft 21. These belts pass over guiding rollers 33 held on studs 34 fastened to each turning and dipping guide 28 (see Figures 10 and 11). Thus, as the welt bar take-up shaft 20 and wind-up shaft 21 are rotated in clockwise direction, the cone-shaped drums 32 will wind up the spring belts 29 as they are unwound from the drums 31 and the welt bar 22 will be moved toward the knitting station. Counterclockwise rotation of the shafts will move the welt bar 22 away from the knitting station.

Positioned on the welt wire shaft 50 is a pair of spools 52. In alinement with the spools 52 there is rotatively carried on the turning and dipping guide shaft 23 a pair of guiding rollers 53. A like pair of guiding rollers 54 is carried on the shaft 55 immediately below the shaft 23 (see Figure 24). An endless spring belt 56 is wound around each spool 52 and extends around the respectively alined rollers 53 and 54. Positioned on each endless spring belt 56 is a welt wire engaging hook 57. The engaging hooks 57 are positioned so that a line extending between them will always move in parallel relation to the axis of the welt wire take-up shaft 50. As the welt wire take-up shaft 50 is moved in clockwise direction, the welt bar 22 will be moved toward the knitting station. Welt wire tensioning drum 51 when manually wound by the operator tends to rotate the welt wire take-up shaft 50 in a counter-clockwise direction, thus urging the welt wire away from the knitting station.

Loosely mounted on the welt bar shaft 20 is a roller housing 35 into which the welt bar 22 and the welt hooks 36 can slide to protect the hooks 36 when they are not engaged with the fabric, as is shown in Figure 8, or to permit the welt bar 22 to withdraw the fabric and wind it about the roller-housing 35 when the machine is used to knit weltless top or short welt hosiery or fabric. The opening to the housing 35 is maintained in the position shown in Figure 8 by reason of a weighted portion 37 opposite the housing opening. A take-up roller 58 is fixed to welt wire take-up shaft 50 and rotates as the welt wire-engaging hooks are moved.

The welt hooks 36 have a special shape as shown in Figures 40 to 42, inclusive. At one end is a shank 36a which is adapted to be engaged in the welt bar 22 in the customary manner. At the other end is the usual hook 36b which holds the first course loops. Intermediate their ends is formed on the top a hump 36c which engages the first course loops during the welt turning action to prevent them from sliding up onto the shank and to keep them below the sinkers 6. Immediately to the left of hump 36c the sides of the hooks are depressed at 36d. This provides additional clearance space between adjacent hooks so that a respective sinker or divider 6 may be easily inserted between adjacent hooks. The bottom of the hook to the right of the hump 36c is provided with a groove 36e which receives the beard of a needle during the welt turning action, as will be more fully hereinafter described.

To automatically operate the welt bar take-up shaft 20, it is provided with a pinion 38 (see Figure 7). The pinion 38 when moved in a clockwise direction engages through a one-way clutch mechanism of standard design to turn the welt bar shaft 20 in the same direction. However, upon movement of the pinion 38 in counterclockwise direction it will move freely and not cause movement of the welt bar shaft 20. Rotation of the pinion 38 is controlled by the vertical reciprocatory movement of a rack bar 39 held in engagement with the pinion 38 by a roller guide 40 positioned on a stud shaft 41 secured by a bracket 42 to the frame 1 of the machine. The vertical reciprocatory movement of this rack bar 39 will be hereinafter described.

In order to control the positioning of the welt bar 22 with respect to the knitting station, there is placed on welt bar shaft 20 a collar 43 having formed thereon an abutment 44. The rotational position of collar 43 can be regulated by rotating the same on the shaft 20 to a desired position and clamping it in such position by the use of a set screw. Carried on the frame 1 by means of a stud shaft 45 is a welt bar latch 46 (see Figure 14 for details) having an engaging tooth 48. The latch 46 is provided with a spring positioning device 49 which holds it spring biased in open position (see Figures 7 and 13) or spring-biased in closed position (see Figure 14). Carried on the latch 46 by two screws is a slotted extension bar 47 having a small operating handle. The bar 47 when moved to an extended position is engaged by the rack bar 39 as that bar is moved upwardly (see Figure 14). The extension 47 when withdrawn is free of engagement by rack bar 39 (see Figures 18 and 20). When the latch 46 is in its engaging position (see Figure 14), its tooth 48 will engage with the abutment 44 on collar 43 and prevent further counter-clockwise rotation of welt bar shaft 20. The collar 43 is so adjusted that the welt bar 22 is accurately positioned in an intermediate latched position, as shown in Figure 12, and held in this position by the action of the latch 46. From this position the welt bar may be moved a positively determined distance by the action of the positioning cam hereinafter described. It is to be understood that in the latched position the welt bar tensioning device 24 (see Figure 19) will be inoperative to move the welt bar 22 away from the knitting station.

Figures 10, 11:
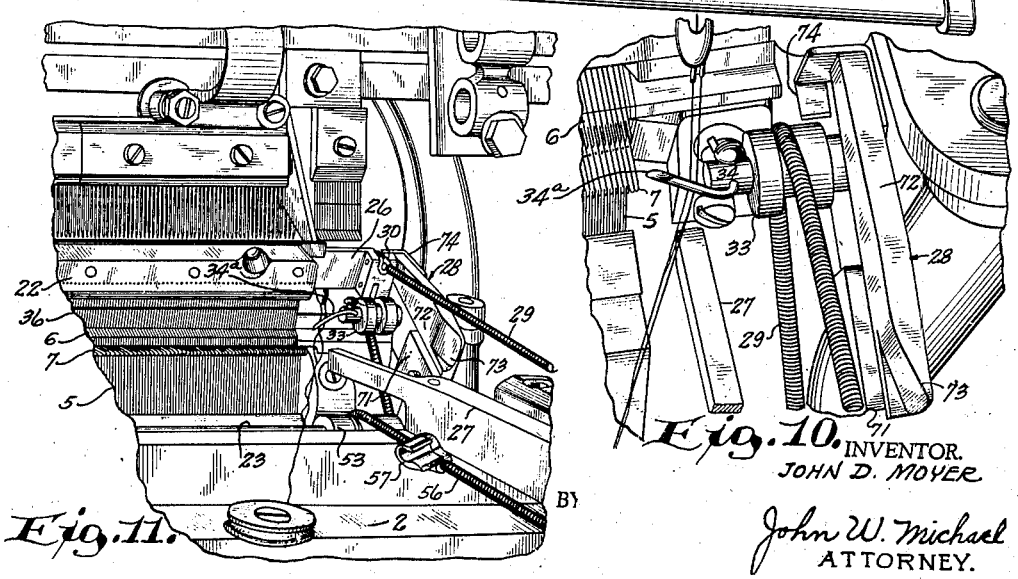
Figure 10 is a perspective, fragmentary, enlarged view of one of the turning and dipping guides for the welt bar with the guide in raised position to receive the welt bar.
Figure 11 is a perspective, fragmentary, enlarged view of one of the turning and dipping guides viewed in Figure 10, with the welt bar advanced into the guide and turned against the flanges on the end thereof to the position assumed before dipping.

The turning and dipping guides 28 are shown in detail in Figures 10 and 11. They are fixedly mounted on the turning and dipping guide shaft 23 and pivot about its axis in unison. Each guide of a pair for a section is positioned adjacent a flat guide 27, and operates within the space formed by the narrowed end of those guides. The turning and dipping guides 28 are identical in construction with each other, except one is right hand and the other is left hand. The guides 28 have a portion 71 which is clamped to the turning and dipping guide shaft 23, and an extension portion 72 which has a tapered entrance 73. In the lowered position the extension portion 72 is substantially parallel with the flat guides 27. The tapered entrance 73 engages the ends of the welt bar as it moves into the guides 28 and positions those ends against the inner surface of the extension portion 72 to guide the welt bar 22 in proper relation to the needles 5 as it approaches the knitting station. The ends of the extension portion 72 are provided with L-shaped brackets 74. The brackets 74 each have a bottom and a side. As is shown in Figure 11, the bottoms of the brackets are adapted to engage the forward sides of the ends of the welt bar 22 and the sides of the brackets are adapted to engage the tops of the ends of the welt bar 22 when that welt bar is turned. As is shown in Figure 4a, the upper portion 72 is secured to the lower portion 71 by lock bolts carried in 71 and adjustably slidable in a slot formed in portion 72. This permits the individual adjustment of the guides 28 toward and from the knitting station. The guides 28 may also be adjusted angularly with respect to the shaft 23. The turning of the welt bar 22 in the guides 28 is effected by rotating the welt bar shaft 20 in clockwise direction. This moves the welt bar toward the knitting station where it starts to ride over rollers 33. A tension is also created in the spring belts 29 between the welt bar 22 and the cone-shaped drums 32 which tips the welt bar 22 over the rollers 33. The rollers 33 are so positioned with respect to the L-shaped bracket 74 that as the bar 22 is tipped over the rollers 33 it engages the brackets 74, and is held as heretofore set forth. The tipping occurs when the guides 28 are in the raised position, as shown in Figure 11.

The raising and lowering of the turning and dipping guides 28 is accomplished by rotating the raising and dipping shaft 23 by imparting reciprocatory rotary movement thereto. This is accomplished through the crank lever 75 shown in Figure 4a. The crank lever 75 is operated through a connecting rod 76, as will be hereinafter described.

The turning and dipping guides 28 also carry thread hooks 34a shown in Figures 7, 10, and 11. The thread hooks 34a are held in holes provided in stud shafts 34 by set screws or other means. As so carried, they are in approximate alinement with the thread carriers when such carriers are moved to the side of a respective section, such as is the case when the completed fabric is cleared off. Each hook 34a is bent inwardly (with respect to a section) and downwardly. As the guides 28 are raised, the back or top of hooks will brush the thread ends extending from the carriers inwardly (with respect to a section) until they clear the ends of the hooks. Then as the guides 28 are lowered, the hooks 34a will engage the thread ends and carry them downwardly below the path of travel of the welt bar. This enables the next set to be started without any manual clipping of the threads used in the previously completed fabric. As hereinafter described, all the guides 28 are simultaneously raised and lowered by the action of a cam bit carried by the raising and lowering cam.

The welt wire placer, shown in an enlarged sectional view in Figure 17a, comprises a holding rod 61 extending the length of the machine. Rod 61 is held in arms 62 which are pivoted to stub shafts 63 held in bearings 64 on the frame 1 of the machine. For each section there is secured to the holding rod 61 a pair of welt wire holders 65. The welt wire holders 65 comprise a base 66, split and clamped to the rod 61, and a snap-acting jaw 67. The base 66 permits the holders 65 to be adjusted so that when the arms 62 are lowered to welt wire placing position, the jaws 67 will be properly placed with respect to the fabric (see Figure 17). The snap-acting jaw 67 is formed of two teeth urged together by a small encircling spring which is of sufficient tension to permit the easy insertion and withdrawal of the welt wire 59 from the jaw 67. To maintain the holding bar in raised out-of-the-way position there is provided a holding lever 68 which is pivoted to the frame of the machine and has a notch 69 which engages with the holding rod 61. To place the welt wires 59 on the fabric and engage them in the welt wire engaging hooks 57, as is shown in Figure 17, the lever 68 is swung from the position shown in Figure 17a to that shown in Figure 17. The holding rod 61 or one of the arms 62 may then be swung to the position shown in Figure 17. Thereafter the ends of the welt wires 59 may be interlocked with the welt-wire-engaging hooks 57 by rotating the welt wire take-up shaft 50 in a counter-clockwise direction, forcing the hooks 57 outwardly and onto the welt wires 59. Thereafter the welt wire holders 65 may be swung upwardly and latched in their out-of-the-way position, as shown in Figure 18.

Figure 2:
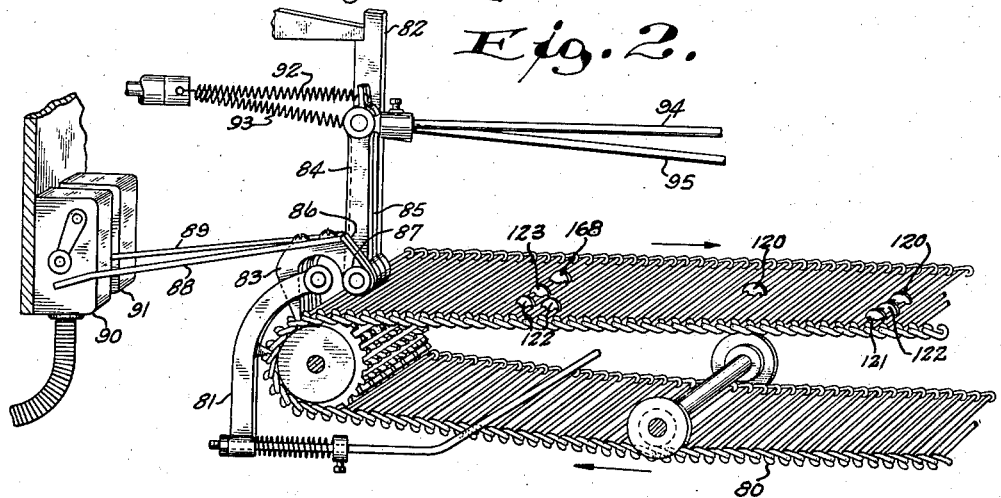
Figure 2 is a perspective, partially diagrammatic, view of the pattern chain, control buttons, and motivating levers for controlling the sequence of the operations of the welt-turning mechanism.

The control of the sequences of the automatic operations is obtained by the use of operating levers operated by control buttons placed on the pattern chain 80. The pattern chain 80 is of standard construction (see Figure 2). The means by which it is moved one link at the end of each revolution of the main cam shaft 3, the manually operated treadle for starting the operation of the chain, the stop button, and the means for effecting control of the narrowing operation are not shown, as they are of standard construction and form no part of this invention. There are shown for purposes of illustration the loose course lever 81, the graduated reinforcing lever 82, and the first slow speed lever 83. In addition to these levers there have been added a welt-positioning lever 84, a turning and raising lever 85, and an additional second slow speed lever 86. These levers (except lever 81) are mounted on a common shaft 87. Each has a finger which is adapted to engage the control buttons carried on the links of the pattern chain 80. As the chain 20 advances, and the rounded surface of a button is forced under the finger of a respective lever, that lever is given a clockwise motion as viewed in Figure 2. There are illustrated in Figure 2 two sets of control buttons. The right hand group shows the number of buttons and their relative positioning for controlling the starting of the set. The left hand group shows the number and relative positions of the buttons for controlling the turning of the welt. It is to be understood that there are many other combinations of buttons in addition to those disclosed for performing the picoting, narrowing, graduated reinforcing, and similar operations. The first and second slow speed levers 83 and 86 have extensions 88 and 89, respectively, which lie beneath the switch handles of the first and second slow speed switches 90 and 91. As the levers 83 and 86 are moved in clockwise direction the extensions 88 and 89 are raised and move the switches 90 and 91 into the respective slow speed positions. The positioning lever 84 and turning and rising lever 85 are maintained in neutral position by springs 92 and 93, respectively. The positioning lever 84 has a connecting rod 94 which extends along the front of the machine to the lever 100 shown in Figure 3. The turning and raising lever 85 has a connecting rod 95 which extends along the front of the machine and is secured to the lever 150 shown in Figure 3.

It was previously stated that vertical reciprocatory movement of the rack bar 39 controlled the positioning of the welt bar 22 (see Figure 7). This vertical reciprocatory motion is attained by the use of cams positioned on the main cam shaft 3. These cams are shown in Figure 3. Cam 101 (see Figure 34) is hereinafter termed "positioning cam" because under its control the reciprocatory rack 39 is raised only a sufficient distance to move the welt bar 22 to the position shown in Figures 7 and 13 for the purpose of starting the set. Cam 151 (see Figure 33) will be hereinafter termed the "turning cam" as under its control the rack bar 39 is reciprocated to a greater distance to move and turn the welt bar 22 into the welt turning position, as shown in Figures 11 and 22. The reciprocatory action of the rack 39 is accomplished by moving the pivoted roller arm 152 about its pivot point. Arm 152, as well as a similarly shaped roller arm 102, is pivoted in a bracket 103 secured to the frame 1 of the machine. The roller arm 152 has at its forward end (Figure 3) a slot 153. Fitted in the slot 153 is a stud shaft 154 which is secured by a nut and washer 155. This stud shaft 154 may be adjusted vertically in the slot 153 by an upper and lower set screw. When adjusted, the stud shaft 154 is tightly secured in position by tightening up on the nut 155. The ratchet is secured to a block 156 which is pivotally positioned on the reduced end portion of the shaft 154 and held thereon by a collar 157. The roller arm 102 has at its forward end a lateral extension 104 which underlies the roller arm 152. In this extension 104 there is placed a set screw 105, the adjustment of which raises the roller arm 152 with respect to roller arm 102. Roller arm 102 carries a laterally projecting shaft 106 on which is loosely mounted a cam-engaging roller 107 and a shifting disk 108. The cam-engaging roller 107 is shifted to the right into alinement with the positioning cam 101. Roller arm 152 also carries a similar shaft, shifting disk and cam-engaging roller 158. Roller 158 is shifted to the left to aline with turning cam 151. In order to effect the shifting of the rollers into their cam-engaging positions, there are provided two shifter forks, one for each roller. Shifter fork 109 for roller 107 is pivotally mounted on a half round stud 110 projecting laterally from roller arm 102. The rear of shifter fork 109 is slotted to engage with a finger 111 (see Figures 3 and 9). The shifter fork 159 for roller 158 is not completely shown but is a duplicate of the shifter fork 109 for roller 107 and is mounted in the same manner and is likewise operated by finger 160. The finger 111 is adjustably carried on rod 112 and the finger 160 is adjustably carried on rod 161. These rods are held one above the other on the rear of the machine by a pair of spaced brackets 113 extending from the frame 1 (see Figure 9). Lever 100 (see Figure 3) and lever 114 (see Figure 9) are each mounted on a shaft 115 passing through the machine from front to rear and held on the frame by bearings 116 formed in brackets 117. Lever 150, as shown in Figure 3, and lever 162, as shown in Figure 9, are mounted on a shaft 163 likewise extending from the front to the rear of the machine and held in bearings 164 in the same bracket 117. It should be noted that lever 114 extends upwardly and lever 162 extends downwardly (see Figure 9). Upwardly extending lever 114 has pivoted thereto an adjustable socket 117a into which rod 112 is adjustably secured. Downwardly extending lever 162 has a similar socket 165 into which the end of rod 166 is secured. This latter rod 166 extends from the position shown in Figure 9 along the back of the machine to the right hand end thereof, as viewed in Figure 1, where it engages with shifting fork 300 to be hereinafter described. The rod 161 is bent so as to connect with rod 166 through an adjustable connecting block 167. Thus as downwardly extending lever 162 operates, these rods (161—166) are operated in unison. Each of the roller arms have their forward ends urged downwardly by the reaction of respective springs S extending between the rearward end of the arms and the frame of the machine (see Figure 9). When the main cam shaft 3 is turned so that positioning cam 101 is in the position shown in Figure 12, an adjustable set screw 118, positioned in a bracket 119 secured to the frame 1 of the machine, engages with the laterally extending finger 104 on roller arm 102. This adjustment permits roller 107 to be held slightly above the positioning cam 101 and thus its lateral shifting into alinement therewith will be readily accomplished. By adjusting screw 105 in the laterally extending finger 104, the roller arm 152 may be likewise adjusted so that roller 158 similarly clears the turning cam 151. As lever 84 is moved to the right under the influence of the control button 120 the shaft 115 will be turned in a counter-clockwise direction, as viewed in Figure 3. This in turn shifts lever 114 in the rear of the machine to the right (as viewed in Figure 9), causing the rod 112 and finger 111 to shift the slotted end of the shifter fork 109 to the right, which in turn moves shifting disk 108 and roller 107 to the right (as viewed in Figure 3) and into alinement with positioning cam 101. As button 120 is shifted from beneath the finger of the shifting lever 84, the reverse motions will take place and the roller 107 will be shifted out of cam engaging position. The shifting as controlled by the pattern chain 80 takes place substantially when the cam is positioned as shown in Figures 12, 16, and 34.

Figure 24:
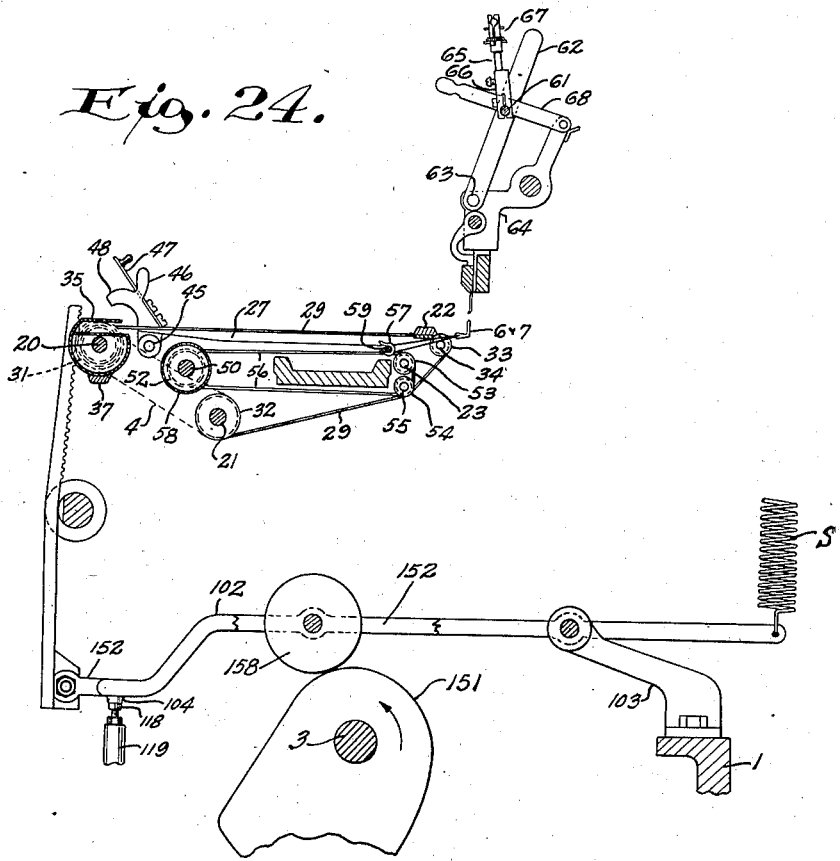
Figure 24 is a diagrammatic view of the welt bar and turning cam as positioned at the completion of the welt-turning cycle.

When turn control button 168 engages with the finger of shifting lever 85, rod 95 is shifted to the right, causing lever 150 to shift to the right and force shaft 163 in a counter-clockwise direction (as viewed in Figure 3). This moves the downwardly depending lever 162 to the left (as viewed in Figure 9). This, in turn, moves rod 166, connecting block 167, rod 161, and finger 160 to the left, pivoting the shifter fork 159 and shifting the roller 158 to the left (as viewed in Figure 3) the thickness of one cam. The roller 158 will merely move to a standard fabric release cam 169. This cam releases fabric tension during the narrowing operations when the tension is applied to the fabric through the welt bar. However, at this same time the narrowing mechanism shifts the main cam shaft 3 to the right a distance of the thickness of one cam, and this slides turning cam 151 into alinement with roller 158. This shifting takes place when the cam is positioned as shown in Figures 24 and 33.

At the same time that rod 161 is shifting roller 158, rod 166 will also be pivoting the shifter fork 300 (see Figure 5). At the same time, the shifting of lever 150 to the right (see Figure 3) also shifts connecting rod 200 to the right. Rod 200 is also shown in Figure 4 where there is disclosed the raising cam 201 (see Figure 35). The raising cam 201 is positioned on the main cam shaft 3 in the customary manner. Raising cam 201 also has adjustably secured thereto a cam bit 211 (see Figure 35a). Positioned on the frame 1 is a stud shaft 202. Pivoted on the stud shaft 202 is a rearwardly extending roller arm 203. The roller arm 203 has at its inner end a laterally extending stud shaft 204 which is more clearly shown in detail in Figure 4a. The arm 203 is urged downwardly by a spring 213 which extends from its inner end to a point on the frame. Intermediate its ends, and to the left as viewed in Figure 4, the roller arm 203 carries a further stud shaft 205. Rotatably mounted on shaft 205 is a cam-engaging roller 206 which may be slid axially by the movement of shifting disk 207, and a cam bit roller 210 which may be slid axially by a shifting fork 212. The movement of shifting disk 207 is controlled by shifting fork 208 pivotally mounted on a flat top stud shaft 209 also secured to the roller arm 203. Shifting fork 212 is also pivotally mounted on shaft 209. Thus, as rod 200, which is secured to shifter fork 208, is moved to the right, the forward end of shifting fork 208 will be moved to the right and the jaws of the shifting fork 208 will move the disk 207 and with it the cam-engaging roller 206 to the left. This moves the cam-engaging roller 206 into position to be in alinement with the raising cam 201 when that cam is moved to the right the thickness of one cam under the narrowing action. There is an adjustable set screw (not shown) mounted on an extension (not shown) of the frame 1 to limit the downward movement of the inner end of the roller arm 203 in substantially the same manner as that heretofore described with respect to roller arm 102 shown in Figure 3. By this adjustment roller 206 is maintained in a position so that when the cam 201 is at its low point, as substantially shown in Figure 35, the roller 206 will be sufficiently spaced therefrom so as to move laterally into alinement therewith. Raising cam 201 is so designed (see Figure 35) that during a complete cycle of the cam shaft it will raise the roller arm 203 up, dip the roller arm 203 partly down, and from this position move it through an up and down dip synchronized with the needle motion during the narrowing cycle, and finally, at the completion of the cycle, lower the roller arm 203 to its fully down position. This motion of the roller arm 203 is transmitted through the stud shaft 204 to the connecting rod 76. This rod 76 in turn imparts the movement to the crank lever 75 fastened to the shaft 23. The reciprocal movement imparted to the roller arm 203 causes the turning and dipping guides 28 to raise up to the position shown in Figures 10 and 11. The movement of the roller arm 203 then causes the welt bar 22 to dip fully down, as shown in Figure 28. When the welt bar 22 is fully down the needle bar presser cam on the narrowing side causes the needles 5 to move into the grooves 36e in the welt hooks 36, as shown in Figure 29, and the movement of roller arm 203 synchronizes the welt hook action with the needle action under narrowing movement control. The roller arm motion then causes the welt bar to rise, as shown in Figure 30.

A spring 214 resiliently urges the outer end of shifter fork 212 to the right so that roller 210 is held out of engagement with cam bit 211. Whenever it is desirable to cause thread hooks 34a to perform their thread-engaging operation heretofore described, shifter fork 212 is manually moved so that roller 210 will be engaged by cam bit 211 as the shaft 3 revolves. This causes the turning and dipping guides 28 to be momentarily raised slightly beyond their highest extent as caused by raising cam 201. This action permits the hooks 34a to engage threads and move them out of the way.

As heretofore explained, at the same time as the roller 158 for the turning cam 151 is shifted, a shifting fork 300 disclosed in Figure 5 was pivoted. Positioned on that portion of the main cam shaft 3, shown in Figure 5, is a tension release cam 301 (see also Figure 36). Above the cam 301 is a roller arm 302 which is pivoted to the frame 1 of the machine in substantially the same manner as described in connection with the roller arm 102 shown in Figure 3. The roller arm 302 has a stud shaft 303 projecting to the left on which is rotatably mounted a roller 304 and a shifting disk 305. The shifter fork 300 is carried on a flat top stud shaft 306 also mounted on the roller arm. The shifter fork 300 has a rearwardly extending slotted portion which engages with a finger (not shown but identical with finger 111) positioned on the rod 166 in the same manner as the fingers 111 and 160 shown in Figure 9. As rod 166 is moved to the left, as viewed in Figure 9, it pivots the fork 300 which moves the disk 305 and shifts roller 304 to the left, as viewed in Figure 5, the thickness of one cam. However, the roller 304 will not come into alinement with the tension cam 301 until that cam, along with the turning cam 151 and raising cam 201, are shifted to the right under the shift of the cam shaft 3 as controlled by the narrowing motion. There is a standard fabric release cam (not shown) adjacent cam 301 upon which roller 304 operates during the standard narrowing operation. This release cam momentarily relieves tension on the fabric when the tension is applied to the fabric through the welt wires. This is similar to the action of standard fabric release cam 169. Here again there is provided an adjustable set screw stop 304a which is secured to an extension 304b fastened to the frame 1 which limits the lowered position of the roller arm 302 so that there will be sufficient spacing for the roller 304 to slide laterally into alinement with the cam 301 when the same is at its low point. Roller arm 302 has an upper extension 307 on which is secured a spindle 308. Rotatably mounted on the spindle 308 is a block 309. A rack arm 310 (see Figure 8) is mounted on the block 309. The rack arm 310 engages with a pinion 311 carried by welt wire shaft 50. The pinion 311 has a one-way clutch by which it can impart clockwise motion only to shaft 50. Rack arm 310 is maintained in operative engagement with the pinion 311 by a roller 312 rotatably carried on a stud shaft 313 fixed to a bracket 314 carried by the frame. As the rack arm 310 is raised it rotates the wheel 311 causing shaft 50 to rotate in a clockwise direction. This carries the welt wires 59 toward the knitting station. As the cam shaft 3 is rotated through the turning cycle, cam 301 will be in engagement with the roller 304. The shape of cam 301 (see Figure 36) causes the roller arm 302 to raise and urge the rack arm 310 upwardly to the position shown in Figure 23, at which place it is held by the engagement of latch 315 pivotally mounted on the frame 1. The purpose of this is to move the welt wires 59 forward one-half of the distance that the welt bar 22 is moved (during turning motion) so that tension on the fabric is relieved during the turning of the welt.

It has heretofore been explained that the welt hooks 36 are shifted a half needle from a position between the needles 5 to a position in direct alinement with the needles and after the first course loops have been placed on the needles, are shifted back again to the original position. This motion is controlled by a micrometer axial movement of the raising and dipping shaft 23. The mechanism (see Figure 6a) for controlling this movement comprises a sleeve 251 which is rotatively positioned on the end of the raising and dipping shaft 23 and rests against the shaft bearing 252 held on the frame. The sleeve 251 has a crank 253 secured thereto by means of which the sleeve may rotate relative to the shaft 23 and bearing 252. A collar 254 having a reduced threaded portion 255 is affixed to the end of the shaft 23. An internally threaded collar 256 is mounted on the threaded portion 255. The collar 256 may be adjusted to position the shaft 23 so that the welt hooks 36 are accurately placed. As the crank 253 is moved downwardly the sleeve 251 is rotated in a clockwise direction. The end of sleeve 251 bearing against the bearing 252 has a very slight camming surface which upon such rotation permits it to move toward the left. Thus the shaft 23 moves to the left a distance of a half a needle. A spring (not shown) on the opposite end of the shaft 23 urges it to the left.

In order to move the crank 253 downwardly at the proper time and for the required space of time, a half needle cam 257 (see Figure 37) is positioned on that portion of the main cam shaft 3 shown in Figure 6. The cam 257 is placed to the left of a circular spacer 258. Cam 257 has a low portion extending for approximately half of its circumference. Pivotally mounted on a stud 263 projecting from the frame 1 of the machine is a roller arm 259 which carries at its inner end a cam-engaging roller 260. The roller arm 259 is urged in a clockwise direction, as viewed in Figure 6, by a spring 261 which extends between the free end of the arm 259 and the frame 1. In normal operation, the roller 260 rides on the circular spacer 258. This causes no operation of the roller arm 259. However, as the cam shaft 3 is shifted to the right at the beginning of the turning cycle under the operation of the narrowing mechanism, the half needle cam 257 is shifted with the cam shaft 3 and comes into alinement with the roller 260. The half needle shifting cam 257 is so positioned (relatively speaking) with respect to the turning cam 151 and raising cam 201 that its low portion comes into effective operation immediately after the start of the turning cycle. The low portion permits the roller 260 and roller arm 259 to move downwardly, which motion is transmitted to the crank 253 through a connecting rod 262, pivotally secured to the free end of arm 259 and free end of crank 253. Thus the micrometer camming sleeve 251 is turned as heretofore described, and the shaft 23 is moved a half needle distance to the left. The welt hooks are maintained in the half shifted position until the raising cam 201 starts raising the welt bar 22. Thereafter the welt hooks 36 shift to the between needle position. There is sufficient room between the sinkers and dividers to permit the narrow end of the welt hooks and the narrow tops of the needles to pass by side by side. This motion takes place after the welt loops have been positioned over the tops of the needles, as shown in Figure 30. In fact, this action takes place between the positions shown in Figures 30 and 31.

It has heretofore been explained that the use of roller housing 35 permits tension to be continually applied to the fabric without the use of welt wires. This in turn permits a shorter welt to be turned. In turning a short welt the welt hooks must be continuously engaged with the first course loops even after the welt has been turned and those loops knitted in with the next course. This is a characteristic of this invention. In order to turn a very short welt a special small welt turning cam 170 (see Figure 38) is substituted for the turning cam 151 heretofore described. Also a special catch bar cam 171 (see Figure 39) is (a) either substituted for the standard catch bar cam narrowing side or (b) is added to the cam shaft 3 adjacent the standard catch bar cam. In case (a) the standard narrowing motion cannot take place after the small welt is turned unless the standard cam is re-substituted for the special cam. In case (b) it is necessary to add to the back catch bar cam lever (for horizontal movement) a shifter fork shifting disk and cam roller assembly similar to that on roller 203 shown in Figure 4. Such assembly would be controlled by a special chain button, lever and rod arrangement similar to that shown in Figures 2, 3, and 4.

The cam 170 merely regulates the amount of the forward movement of the welt bar 22. As the turning motion is commenced when the welt bar has been withdrawn only ten to sixteen courses, this amount will be exceedingly less than that caused by cam 151. Cam 171 likewise limits the outward movement of the sinkers and dividers (see Figure 44). It also synchronizes the movements of the sinkers and dividers with the welt bar turning and raising and dipping movements so that the noses of the sinkers and dividers hold the fabric as it is turned (see Figure 45). This prevents it from getting between the welt hooks 36 and needles 5.

The operation to knit a turned welt stocking will now be described, the description being limited to one section of the knitting machine. In Figures 8 and 26 the welt bar 22 is shown in the position assumed after it has been manually disengaged from the loops of the first course after these loops have been knitted back into the fabric. The machine is now cleared in the customary fashion by operating it through one complete cycle without the yarn carriers in action. At this time the operator moves shifter fork 212 to the right and the thread hooks 34a go through the cycle heretofore explained and carry the threads down out of the path of the welt bar. Then the operator manually positions the welt bar 22 through operation of welt bar tensioning drum 24 (see Figure 19) to the latched position shown in Figure 12.

It is understood that at this time the cam shaft has come to rest in such a position that the needles 5, sinkers, and dividers 6, knockover bits 7, and yarn carriers (not shown) are in position to commence laying the first course. The operator now steps on the treadle (not shown) controlling the operation of the pattern chain 80 which also advances that chain one link. In Figure 2 the buttons are shown in the position assumed after they have performed the operations hereafter described. This is for the sake of clarity in showing the relative relation of the buttons. As the chain 80 is advanced one link the following three events occur simultaneously. One, control button 121 engages with the tooth on loose course lever 81. The operation of this lever sets in engagement a mechanism which causes the conventional loose course to be formed. Two, control button 122, which is in alinement with the tooth of the first slow speed control lever 83, engages with that tooth to shift the lever 83 to operate switch 90 to slow speed position. Both of these operations are performed by the standard type of full-fashioned hosiery machine known to those skilled in the art. Three, the positioning control button 120 is in alinement with the tooth of lever 84 and engages it, causing that lever 84 to shift to the right as viewed in Figure 2. This motion, as heretofore described, shifts the roller 107 into position to be operated by cam 101.

The operator now starts the motor by operating the starter rod 8. As cam shaft 3 rotates through the slow speed "starting of the set" cycle the welt bar 22 is moved to the knitting station (see Figure 13) and the welt hooks 36 extend between the needles 5 (see Figure 15) above the knock-over bits 7 and below the sinkers 6. It is held in this position until the loose course loops formed by the sinkers and dividers 6 are transferred to the welt hooks 36. The welt bar is then placed under the tension of the drum 24 so that it will be urged rearwardly to take up the fabric (see Figure 16). This it continues to do as the latch 46 has been moved to its spring-biased out-of-engagement position.

At the end of the "staring" cycle the pattern chain advancing mechanism (not shown) shifts the pattern chain 80 one link. This moves the buttons 120, 121, and 122 out from under the teeth of loose course lever 81, slow first speed lever 83, and positioning lever 84. These levers, under the operation of their respective tensioning springs (not shown except 92) shift to the left to disengage the loose course mechanism, disengage the first slow speed switch 90, and shift the roller 107 to the left and out of engagement with the cam 101. Thereafter the machine continues to knit standard courses at full speed. After a few courses have been laid, a chain saver button (not shown) stops the operation of the pattern chain driving mechanism.

After a predetermined number of courses have been laid, a course counter (not shown) causes the machine to perform the picot operation. This will not be described as it is no part of this invention except in so far as the machine operates to perform the picot without interference from the additions to the machine required to perform the welt-turning operation.

While the machine is doing regular knitting, the operator will clear off the previously completed fabric, place the welt wires 59 in the welt wire holders 65, and manually place the welt wire hooks 57 into position to receive the welt wires 59 (see Figure 16) by manipulating the tension drum 51 or the take-up rollers 58. After the picot operation has been performed, and the welt bar 22 has been withdrawn to the position shown in Figure 17, the operator will manually operate the welt wire places to simultaneously place the welt wires 59 tin the hooks 57 as has previously been described. The operator may then replace the welt wire holders 65 to the position shown in Figure 18.

Thereafter the operator withdraws the bar 47 on the latch 46 and rotates the latch to its locking position (see Figure 20). When a predetermined number of courses have been knitted after the picot operation, the course counter again causes chain motion to operate. Thereupon another positioning control button 120 (middle group in Figure 2) engages the lever 84, causing it to shift the roller 107 into engagement with the positioning cam 101. During the next ensuing cycle the welt bar 22 is advanced toward and withdrawn from the knitting station. As it starts from a point further away from the knitting station than the latched position shown in Figure 12, it will not advance all the way to the knitting station (see Figure 20). Upon its withdrawal the latch 46 engages the abutment 44 and the bar 22 is stopped in the latched position (see Figure 21). During the time that the welt bar 22 is being moved, the proper tensioning on the fabric is maintained through the welt wires 59. The slight motion of the welt wires 59, as the bar 22 is moved, tends to wind the welt wire tension drum 51 and this establishes the proper tension. After the welt bar 22 has been moved to the latched position (see Figure 21) the operator manually winds up the welt wire tensioning drum 51, and as further knitting takes place proper tension will be maintained on the fabric and it will be drawn under the welt bar. The welt loops on the welt hooks 36 will then slide toward the bar 22. This motion, however, will be arrested by the small humps 36c located intermediate the ends of the welt hooks which engage the loops (see Figures 40 and 41). The purpose of thus preventing the loops from sliding further down the welt hooks will be hereinafter explained. At the end of this cycle the pattern chain 80 is advanced another link and button 120 is moved out from under lever 84 and roller 107 is disengaged from cam 101. Regular knitting then continues. The step described in this paragraph is omitted in turning short welts. This is accomplished by omitting control button 12 at the intermediate point on the chain 80.

A predetermined number of courses after the welt bar 22 has been repositioned to the latched position, the pattern chain (controlled by the chain saver) will put in action a series of control buttons (see left-hand group Figure 2) which control the welt-turning operation. The first button to take action will be the first slow speed control button 122 controlling the first slow speed switch 90. This operates lever 83 to cut in slow speed switch 90. This is necessary because it takes substantially a full cycle of operation for the machine to slow down to the desired speed. Then, as the chain 80 is advanced another link, the following control buttons will simultaneously act upon their respective levers: another first speed control button 122, the second slow speed control button 123, the control button (not shown), operating the narrowing mechanism, and the welt bar turning control button 168.

The particular action of the second slow speed button 123 is identical with that heretofore described with respect to the first slow speed button 122. It cuts in second slow speed switch 91 by operating lever 86. The purpose is to further reduce the speed of the machine during the ensuing cycle of the cam shaft. The operation of the narrowing button is old and well known to those skilled in the art and will not be described herein other than to say that it effects a shifting of the cam shaft 3 to the right the thickness of one cam.

The welt-turning button 168 engages with the tooth of lever 85 and shifts that lever to the right as viewed in Figure 2. This motion, as heretofore described, shifts roller 158 into alinement with turning cam 151. It should be noted that the shifting of the cam shaft 3 under the control of the narrowing mechanism takes place at the same time as the shifting of roller 158 so that roller 158 passes over the standard fabric release cam 169.

The motion of lever 85 to the right also moves roller 206 into alinement with raising cam 201. The motion of lever 85 to the right also moves roller 304 into alinement with welt wire tension release cam 301. These alinements, of course, are completed by the shifting of cam shaft 3 to the right, as heretofore described.

In addition to the foregoing alinements between cams and rollers, the longitudinal shift of cam shaft 3 to the right, under the control of the narrowing button, also shifts half-needle cam 257 so it is in alinement with roller 260 (see Figure 6).

During the turning cycle the raising cam 201, turning cam 151, tension cam 301, and one-half needle shift cam 257 operate the various levers as heretofore described to obtain the following ultimate results in the sequence set forth. Cam 201 raises turning and dipping guides 28 to the position shown in Figure 10. At the same time turning cam 151 moves welt bar 22 into the turning and dipping guides 28 and turns it to fit flushly against the brackets 74 with the welt hooks 36 pointing downwardly as is shown in Figures 11 and 27. Also at this time cam 257 operates the micrometer camming sleeve 251 and shifts the welt hooks 36 so that the grooves in the welt hooks 36 are in direct alinement with the needles 5.

At the same time that welt bar 22 is being moved into the turning and dipping guides 28, the welt wire tensioning cam 301 is moving the welt wires 59 toward the knitting position at substantially half the rate of the movement of the welt bar 22. This cam has a low spot (see Figure 36) which increases tension on the welt wires 59 as the welt hooks 36 are raised from their low point before the next dip.

While the foregoing is occurring, the needles 5, sinkers and dividers 6, and knock-over bits 7 are operating in the manner customary with the standard narrowing action cycle. However, the narrowing machine is kept in raised position and out of action.

The raising cam 201 now lowers the welt bar 22 so that the grooves 36e in the welt hooks 36 are directly in back of the needles 5 (see Figures 27 and 28). The needles 5 are now moved into engagement with the hooks 36 (see Figure 29). The first course loops on the welt hooks 36 are resting substantially on the knock-over bits 7 and are below the sinkers and dividers 6. It is the function of the humps on the welt hooks 36 to bring such loops into this position (see Figure 28). The standard catch bar action on the narrowing side causes the sinkers and dividers 6 to advance so that their points are inserted between the welt hooks above such loops (see Figure 29).

At this section of the turning cycle the raising cam 201 is so timed with respect to the standard catch bar cam narrowing side operating the sinkers and dividers 6, the knock-over bit cam narrowing side operating the knock-over bits 7, and the needle bar and presser cams on the narrowing side operating the needles 5, that the sinkers and dividers 6 will slide the first course loops over the tops of the needles 5, but not below the beard as is shown in Figure 30, and also down into the hooked ends of the welt hooks 36.

The turning cam 151 now starts to turn the welt bar 22 back toward flat position (see Figures 30, 31, and 32). Immediately after the start of this turning back, the half-needle shift cam 257 shifts the welt hooks 36 back to their former positions so that the lower narrow portions below the grooves 36e lie in between the needles 5 and the adjacent sinkers. At the same time the raising cam 201 is raising the welt hooks from the last dip position. Thereupon the raising cam 201 lowers the turning and dipping guides 28 to the normal position, as shown in Figure 7. This completes the cycle of the turning operation. The needles 5 now have the needle loops of the last course in their beards and the first course loops over their beards. These latter loops are still held by the welt hooks 36 and tension is being applied by tension drum 24.

At the end of the turning cycle the pattern chain 80 is moved one link and the buttons 122, 123, and 168 are removed from the slow speed levers 83 and 86, and the turning lever 85. The narrowing mechanism is also disengaged. The yarn carriers, which were out of action during the narrowing cycle, now become operative, and as the next course is laid the needles 5 will knit in the needle loop of the previous course as well as the first course loops. Proper tension is now maintained through the tension drum 24 acting on the welt bar 22. After enough courses have been laid so that the welt bar 22 is removed from the knitting position substantially as shown in Figure 25, the operator may disengage the latch 315 (Figure 23) and the proper tension will then be transmitted to the fabric through the welt wires 59 by the welt wire take-up tensioning drum 51 (Figure 20). The operator may then manually unhook the welt bar 22 by turning it upwardly and toward the knitting station, as is customarily done. The welt bar 22 is then slid outwardly into the welt bar housing 35, as shown in Figure 8. The knitting then proceeds in the customary fashion.

As the take-up roller 58 is below the path of the welt bar 22, the fabric, as it is wound thereon, will also lie below the level of the path of the welt bar 22. At the end of the knitting operation the operator need only run his machine through one cycle with the yarn carriers out of operation to take off the fabric. During this cycle the thread hooks 34a may also be operated as previously described. Then without loss of time he may immediately start the machine in operation as the welt bar 22 will move forwardly on its flat guides 27 above the last completely knit fabric and loose threads, and while the first courses of the new fabric are being laid, the operator will have sufficient time to take off the last knitted fabric, break off the loose ends, and secure them to the thread fasteners 9 (see Figure 7).

The operations, with some exceptions, are similar in knitting small welts. The intermediate positioning of welt bar 22 is omitted as the turning cycle commences shortly after the start of the set, i. e. after ten to sixteen courses only have been laid. The control buttons in the left-hand group of Figure 2 are positioned ten to sixteen links away from the right-hand group or the chain saver set to operate the pattern chain so that the left-hand group becomes effective after ten to sixteen courses have been laid. The welt hooks 36 go through the same motions as heretofore described with respect to turning full size welts. This is also true of the needles 5 and knock-over bits 7. The sinkers and dividers, however, have a slightly modified form of action caused by the special catch bar cam 171. At the beginning of the cycle the sinkers and dividers 6 are moved to a partly projecting position, as shown in Figure 44. They are held in this position for approximately sixty to sixty-five per cent of the cycle. During this time the welt bar is raised and simultaneously turned by the action of cam 201 and cam 170 so that the hook portions 36b of the welt hooks 36 carry the first course loops and fabric around and over the noses of the sinkers, as illustrated in Figure 45. Thus the welt is turned without the use of welt wires, and since only the noses of the sinkers are used the welt may be as small as ten to sixteen courses. Then, as the cam 201 lowers the welt bar 22 for the purpose of positioning the first course loops over the tops of the needles 5, the cam 171 withdraws the sinkers and dividers 6, as shown in Figure 46. Then after the welt hooks 36 are lowered as shown in Figure 46, the cam 171 again advances the sinkers and dividers 6 so that they extend between the hooks 36 and above the humps 36c and the first course loops, as shown in Figure 47. Thereafter the cycle is the same as in the case of turning full size welts. The raising cam 201 is so timed with respect to the special catch bar cam 171 operating the sinkers and dividers 6, the knock-over bit cam narrowing side operating the knock-over bits 7, and the needle bar and presser cams on the narrowing side operating the needles 5, that the sinkers and dividers 6 will slide the first course loops over the tops of the needles 5, but not below the beards as is shown in Figure 48, and also down into the hooked ends of the welt hooks 36 (see Figure 49).

The turning cam 170 now starts to turn the welt bar 22 back toward flat position (see Figures 48, 49 and 50). Immediately after the start of this turning back, the half-needle shift cam 257 shifts the welt hooks 36 back to their former positions so that the lower narrow portions below the grooves 36e lie in between the needles 5 and the adjacent sinkers. At the same time the raising cam 201 is raising the welt hooks from the last dip position. Thereupon the raising cam 201 lowers the turning and dipping guides 28 to the normal position, as shown in Figure 7. This completes the cycle of the turning operation. The needles 5 now have the needle loops of the last course in their beards and the first course loops over their beards. These latter loops are still held by the welt hooks 36 and tension is being applied by tension drum 24.

When turning short welts, the tension, during all knitting is continuously applied by the welt bar 22. The operation of shifting the tension to the welt wire take-up is omitted and the fabric is wound around the roller housing 35 after the welt bar 22 has been withdrawn into the protective opening. The welt hooks are not disconnected from the original first course loops until the blank is completely knitted.

Although there is shown and described a certain specific embodiment of the invention, many modifications thereof are possible. The invention is not to be restricted except in so far as is necessitated by the prior art and by the spirit of the appended claims.

I claim:

1. In a full-fashioned flat knitting machine having a series of needles, cooperating knitting elements, and a series of welt hooks to hold the loops of the first course supported in a welt bar; apparatus for automatically turning a welt comprising a stationary runway for said bar, a raising and turning guide for said bar pivotally supported adjacent said runway, operating means for said guide, advancing means for moving said bar toward said needles, withdrawing means for moving said bar yieldingly away from the needles, shifting means for shifting said guide laterally to bring said welt hooks into required relative position with respect to said needles, and means for synchronizing said advancing, operating, and shifting means with the operation of said needles and knitting elements so that said welt hooks position said first course loops over the tops of said needles, said last mentioned means also synchronizing said advancing, operating, shifting and withdrawing means so that said welt hooks after positioning said first course loops over the tops of said needles still retain said loops in the hook portions of said welt hooks and apply tension furnished by said withdrawing means on fabric thereafter knitted.

2. Apparatus according to claim 1 in which the means for synchronizing includes a series of jointly operable cams.

3. Apparatus according to claim 1 in which the means for synchronizing comprises a series of cams on the main cam shaft of said machine effective when said machine is operating through a narrowing cycle with the narrowing machine raised to inoperative position.

4. Apparatus according to claim 1 in which the welt hooks carried by said bar have grooves to receive the beards of the needles during the positioning of the first course loops on the needles.

5. The combination in a flat knitting machine having a series of needles and cooperating knitting elements; of a series of welt hooks, each welt hook having a hook portion for engaging the loops of the first course, an intermediate hump for preventing said loops from sliding, a groove between said hook portion and said hump to receive the beards of said needles, a flattened portion adjacent said hump and on the opposite side thereof from said groove to provide space for the operation of said knitting elements, and automatic mechanism to present said hooks to said needles and elements for positioning the loops of the first course over the tops of said needles while said loops still remain on said hooks.

6. In a full-fashioned flat knitting machine having a series of needles, cooperating knitting elements, and a series of welt hooks to hold the loops of the first course supported in a welt bar; apparatus for automatically turning a welt comprising means for advancing said bar so that hooks enter into the spaces between said needles to receive the loops of the first course and thereafter apply tension on said loops, means for advancing said bar toward the knitting station and turning said bar so that said welt hooks point downwardly, means for raising said bar as it approaches said station so that said hooks move over and in back of said needles, means for synchronizing all of aforesaid means so that the movement of said welt hooks is correlated with the movement of said needles and elements during a standard narrowing cycle to position the loops of the first course over the tops of said needles, said first mentioned means also supplying withdrawing tension to said hooks and said first course loops after positioned on said needles.

7. Apparatus according to claim 6 in which the means for synchronizing includes a series of special cams carried on the main cam shaft of the machine and placed in operation by special control buttons on the pattern chain of said machine.

8. In a full-fashioned flat knitting machine having a series of needles, cooperating knitting elements, and a series of welt hooks to hold the loops of the first course supported in a welt bar; apparatus for automatically turning a welt comprising means for advancing said bar so that hooks enter into the spaces between said needles to receive the loops of the first course and thereafter apply tension on said loops, means for advancing said bar toward the knitting station and turning said bar so that said welt hooks point downwardly, means for shifting said bar laterally so that said hooks move from a position in alinement with the spaces between said needles to a position in respective alinement with said needles, means for raising said bar as it approaches said station so that said hooks move over and in back of said needles, means for synchronizing all of aforesaid means so that the movement of said welt hooks is correlated with the movement of said needles and elements to position the loops of the first course over the tops of said needles, said first mentioned means also supplying withdrawing tension to said hooks and said first course loops after positioned on said needles.

9. Apparatus according to claim 8 in which the means for synchronizing includes a series of special cams carried on the main cam shaft of the machine and placed in operation by special control buttons on the pattern chain of said machine.

10. Apparatus according to claim 8 in which the means for synchronizing includes a series of special cams carried on the main cam shaft of the machine, and cam-engaging means shiftable to cause said cams to be effective by special control buttons on the pattern chain of said machine.

11. In a flat knitting machine, a series of needles, operating mechanism for said needles, a series of welt hooks supported for united movement toward and away from said needles, a spring belt secured to said hooks to effect said movement, a drum and shaft rotatable to effect movement of said belt, tensioning means effective when engaged to yieldably urge said shaft to rotate in a direction to move said hooks away from said needles, a pinion having a one-way drive effective to rotate said shaft in a direction to move said hooks toward said needles, a reciprocating rack bar to rotate said pinion, and means to reciprocate said bar when effctively engaged with said operating mechanism.

12. In a flat knitting machine, a series of needles, operating mechanism for said needles, a series of welt hooks supported for united movement toward and away from said needles, a pair of endless spring belts having an upper run positioned beneath the path of travel of said welt hooks, oppositely positioned welt wire hooks on said belts, drums and shaft rotatable to effect movement of said belts, tensioning means effective when engaged to yieldably urge said shaft to rotate in a direction to move said welt wire hooks away from said needles, a pinion having one-way drive effective to rotate said shaft in a direction to move said welt wire hooks toward said needles, a reciprocating rack bar to rotate said pinion, means to reciprocate said bar when effectively engaged with said operating mechanism, and a welt wire engageable by said welt wire hooks.

13. In a flat knitting machine, a series of needles, operating mechanism for said needles, a series of welt hooks supported for united movement toward and away from said needles, tensioning means to yieldably urge said hooks away from said needles, positioning means to move said hooks toward said needles, cam and lever mechanism to operate said positioning means when effectively engaged with said operating mechanism, a pair of endless spring belts having an upper run positioned beneath the path of travel of said welt hooks, oppositely positioned welt wire hooks on said belts, drums and shaft rotatable to effect movement of said belts, tensioning means effective when engaged to yieldably urge said shaft to rotate in a direction to move said welt wire hooks away from said needles, a pinion having a one-way drive effective to rotate said shaft in a direction to move said welt wire hooks toward said needles, a reciprocating rack bar to rotate said pinion, means to reciprocate said bar when effectively engaged with said operating mechanism, a welt wire engageable by said welt wire hooks, and automatic means for selectively and cooperatively causing said last named means and said cam and lever mechanism to be effectively engaged with said operating mechanism.

14. In a flat knitting machine, a series of needles, operating mechanism for said needles, a series of welt hooks supported for united movement while in a substantially horizontal position toward and away from said needles, tensioning means to yieldably urge said hooks away from said needles, positioning means to move said hooks toward said needles, a pair of turning and dipping guides, pivot means for supporting and operating said guides, bracket means on said guides to hold said welt hooks in a substantially vertical position, said bracket means including portions provided with a taper to engage and laterally position said welt hooks, and automatic means cooperable with said operating mechanism for operating said pivot means and said positioning means to raise said guides and advance and turn said hooks.

15. In a flat knitting machine, a series of needles, operating mechanism for said needles, a series of welt hooks supported for united movement while in a substantially horizontal position toward and away from said needles, tensioning means to yieldably urge said hooks away from said needles, positioning means to move said hooks toward said needles, a pair of turning and dipping guides, pivot means for supporting and operating said guides, bracket means on said guides to hold said welt hooks in a substantially vertical position, said bracket means including portions provided with a taper to engage and laterally position said welt hooks, camming means operable to shift said pivot means axially to move said hooks into alinement with said needles, and automatic means cooperable with said operating mechanism for operating said pivot means, said positioning means, and said camming means to raise said guides, advance and turn said hooks, and shift said hooks laterally.

16. The combination in a flat knitting machine having a series of needles and cooperating knitting elements including sinkers and dividers; of a series of welt hooks, each welt hook having a hook portion for engaging the loops of the first course, an intermediate hump for preventing said loops from sliding, a groove between said hook portion and said hump to receive the beards of said needles, and a flattened portion adjacent said hump and on the opposite side thereof from said groove to provide space for the operation of said sinkers and dividers, automatic mechanism to move said hook portions around and over the noses of said sinkers and dividers and to present said hooks to said needles and elements for positioning the loops of the first course over the tops of said needles while said loops still remain on said hooks.

17. The combination in a flat knitting machine having a series of needles and cooperating knitting elements including sinkers and dividers; of a series of welt hooks, each welt hook having a hook portion for engaging the loops of the first course, an intermediate hump for preventing said loops from sliding, a groove between said hook portion and said hump to receive the beards of said needles, a flattened portion adjacent said hump and on the opposite side thereof from said groove to provide space for the operation of said sinkers and dividers, automatic mechanism to move said hook portions immediately around and over the noses of said sinkers and dividers, to withdraw said sinkers and dividers, to present said hooks to said needles, to advance said sinkers and dividers between said needles in the space provided by said flattened portion, and withdraw said hooks so that the loops of the first course are positioned over the tops of said needles while said loops still remain on said hooks, and means for applying withdrawing tension to said hooks while a series of courses are being knit before and after said loops have been positioned over the tops of said needles.

18. The combination in a flat knitting machine having a series of needles, cooperating knitting elements, and a series of welt hooks supported in a welt bar; of a hook movably mounted and positioned adjacent one end of said series of needles, and means for momentarily raising and lowering said hook to engage thread ends and move the same below the path of travel of said bar.

19. A method of turning a welt which consists of laying a first course with the sinker and divider loops each engaged by welt hooks, knitting a desired number of courses with tension being supplied by said welt hooks, manipulating said welt hooks so that said first course loops are positioned over the tops of the knitting needles while still held on said hooks, and knitting additional courses with the tension still being supplied by said welt hooks.

20. A method of turning a welt which consists of laying a first course with the sinker and divider loops each engaged by welt hooks, knitting a plurality of courses with tension being supplied by said welt hooks, manipulating the welt hooks and sinkers and dividers so that the fabric is folded over the noses of the sinkers and dividers and first course loops positioned over the tops of the needles.

21. In a full-fashioned flat knitting machine having a series of needles, cooperating knitting elements, and a series of welt hooks to hold the loops of the first course, apparatus for automatically turning a welt comprising means for advancing said hooks toward said needles, means for turning said hooks so that they point downwardly in back of said needles, and means for moving said hooks in synchronization with the movement of said needles as they are moved during a standard narrowing cycle whereby the loops of the first course, while remaining on said hooks, are also placed over said needles to be knitted in with the next course, and means for thereafter applying tension to said welt hooks and through them to the first course loops and thence to any fabric subsequently knitted.

22. A method of knitting and turning welt comprising, first, automatically laying an initial course engaged by welt hooks; second, automatically knitting a predetermined number of courses with the fabric tension being applied by welt hooks; third, manually placing a welt wire on the fabric so knitted and engaging it with means to apply withdrawing tension thereon; fourth, automatically repositioning said welt hooks and relieving tension thereon and placing tension on said welt wire; fifth, automatically knitting a predetermined number of courses as fabric is withdrawn by said welt wires; sixth, automatically advancing said hooks with said initial loops to point downwardly in back of the knitting needles; seventh, automatically shifting said welt hooks laterally into alignment with said needles; seventh, automatically dipping said hooks and synchronizing them with the movement of said needles during a standard narrowing cycle to place said initial course loops while on said hooks also onto said needles; eighth, automatically shifting said welt hooks laterally in between said needles and lowering them to normal position; ninth, automatically applying tension to the fabric through said hooks as knitting continues.

23. In a full-fashioned flat knitting machine having a series of needles, cooperating knitting elements, and a series of welt hooks to hold the loops of the first course supported in a welt bar, apparatus for automatically turning a welt comprising means for advancing said bar toward the knitting station and turning said bar so that said welt hooks point downwardly, means for raising said bar as it approaches said station so that said hooks move over and in back of said needles, means for synchronizing all of aforesaid means so that the movement of said welt hooks is correlated with the movement of said needles and elements during a standard narrowing cycle to position the loops of the first course over the tops of said needles, and means for synchronizing said advancing and raising means so that said welt hooks after positioning said first course loops over the tops of said needles are so moved as to still retain said loop in the hook portions of said welt hooks, and means to supply withdrawing tension to said hooks and said first course loops after positioned on said needles.

24. Apparatus according to claim 23 in which the means for synchronizing includes a series of special cams carried on the main cam shaft of the machine and placed in operation by special control buttons on the pattern chain of said machine.

JOHN D. MOYER.